(12) United States Patent
Kim et al.

(10) Patent No.: US 12,160,891 B2
(45) Date of Patent: Dec. 3, 2024

(54) WIRELESS COMMUNICATION APPARATUS USING SHARED TXOP AND OPERATION METHOD FOR WIRELESS COMMUNICATION APPARATUS

(71) Applicant: WILUS INSTITUTE OF STANDARDS AND TECHNOLOGY INC., Gyeonggi-do (KR)

(72) Inventors: Sanghyun Kim, Gyeonggi-do (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 18/512,022

(22) Filed: Nov. 17, 2023

(65) Prior Publication Data

US 2024/0090034 A1 Mar. 14, 2024

Related U.S. Application Data

(63) Continuation of application No. PCT/KR2022/007430, filed on May 25, 2022.

(30) Foreign Application Priority Data

May 25, 2021 (KR) .......................... 10-2021-0067239
Nov. 3, 2021 (KR) .......................... 10-2021-0150135

(Continued)

(51) Int. Cl.
*H04W 74/0816* (2024.01)
*H04W 72/0457* (2023.01)
*H04W 74/08* (2024.01)

(52) U.S. Cl.
CPC ... *H04W 74/0816* (2013.01); *H04W 72/0457* (2023.01); *H04W 74/0866* (2013.01)

(58) Field of Classification Search
CPC ......... H04W 74/0816; H04W 72/0457; H04W 74/0866
See application file for complete search history.

(56) References Cited

U.S. PATENT DOCUMENTS

2018/0092127 A1* 3/2018 Park ................. H04W 72/0453
2018/0235004 A1* 8/2018 Cheong ............... H04W 74/085

(Continued)

FOREIGN PATENT DOCUMENTS

| WO | 2022/056009 | 3/2022 |
| WO | 2022/212468 | 10/2022 |
| WO | 2022/250453 | 12/2022 |

OTHER PUBLICATIONS

International Search Report for PCT/KR2022/007430 mailed on Aug. 24, 2022 and its English translation from WIPO (now published as WO 2022/250453).

(Continued)

*Primary Examiner* — Kashif Siddiqui
(74) *Attorney, Agent, or Firm* — Womble Bond Dickinson (US) LLP

(57) ABSTRACT

A non-AP station for communicating with an access point (AP) is disclosed. The non-AP station comprises a transceiving unit and a processor. The processor: receives, from the AP by using the transceiving unit, a first PPDU including a multi user-request to send (MU-RTS) TXOP sharing (TXS) trigger frame; for the MU-RTS TXS trigger frame, allocates, to the non-AP station, a shared TXOP that is a portion of a TXOP acquired by the AP; transmits, to the AP by using the transceiving unit, a second PPDU including a CTS frame in response to the MU-RTS TXS frame; and (Continued)

transmits a third PPDU within the shared TXOP by using the transceiving unit.

18 Claims, 19 Drawing Sheets

(30) Foreign Application Priority Data

| | | | |
|---|---|---|---|
| Nov. 12, 2021 | (KR) | ........................ | 10-2021-0155384 |
| Feb. 18, 2022 | (KR) | ........................ | 10-2022-0021796 |
| Feb. 28, 2022 | (KR) | ........................ | 10-2022-0026421 |

(56) References Cited

U.S. PATENT DOCUMENTS

| | | | | |
|---|---|---|---|---|
| 2019/0289632 | A1* | 9/2019 | Lou | ............... H04W 74/006 |
| 2022/0264566 | A1* | 8/2022 | Chu | ............... H04W 72/0446 |
| 2023/0189359 | A1* | 6/2023 | Shafin | ............ H04W 52/0258 |
| | | | | 370/311 |

OTHER PUBLICATIONS

Written Opinion of the International Searching Authority for PCT/KR2022/007430 mailed on Aug. 24, 2022 and its English translation by Google Translate (now published as WO 2022/250453).

Das, Dibakar et al.: "PDT: Channel access for Triggered TXOP Sharing", doc.: IEEE 802.11-21/0268r8, May 13, 2021, pp. 1-7.

Sun, Yanjun et al.: "Resolution for Miscellaneous CIDs related to Clause 25.2.1.2 (CC34)", doc.: IEEE 802.11-21/0455r5, May 3, 2021, pp.

Kim, Shawn (Sanghyun) et al.: "CC36 CR for CID 6979", doc.: IEEE 802.11-21/1856r1, Nov. 21, 2021, pp. 1-5.

Das, Dibakar et al.: "CR for Clause 35.2.1.3", doc.: IEEE 802.11-21/1236r0, Aug. 3, 2021, pp. 1-48.

Extended European Search Report dated Jul. 15, 2024 for European Patent Application No. 22811644.8.

"35. Extremely high throughput (EHT) MAC specification ED—802 11 Working Group of the LAN/MAN Standards Committe of the IEEE Computer Society", May 24, 2021 (May 24, 2021), XP002805612, IEEE P802.11beTM/D1.0, pp. 1-70.

Alfred Asterjadhi (Qualcomm Inc) : "LB230-MAC-CR-10.22.2.6-9", IEEE Draft; 11-18-0040-00-00AX- LB230-MAC-CR-10-22-2-6-9, IEEE-SA Mentor, Piscataway, NJ USA, vol. 802.11ax Jan. 10, 2018 (Jan. 10, 2018), pp. 1-7, XP068122739, Retrieved from the Internet: UR: https://mentor.IEEE.org/802.11/dcn/18/11-18-0040-00-00ax-lb230-mac-cr-10-22-2-6-9.docx [retrieved on Jan. 10, 2018], pp. 1-8.

Edward Au: "Draft P802.11be_D1.0.pdf", IEEE Draft WGDS; 942232876538, IEEE-SA IMEET Central, Piscataway, NJ USA, vol. 802.11—Editorial Dec. 5, 2020 (Dec. 5, 2020), p. 1, XP068255523, Retrieved from the Internet: UR: https://IEEE-sa.imeetcentral.com/p/aQAAAAAEgSwz [retrieved on Jul. 20, 2023], pp. 1-78.

* cited by examiner

Trigger frame format (a) CTS response case1

(b) CTS response case2

(a) TXS variant
Common Info field format
(B0 to B25)

| B0  B3 | B4  B15 | B16 | B17 | B18 B19 | B20  B21 | B22 | B23  B25 |
|---|---|---|---|---|---|---|---|
| Trigger Type | UL Length | More TF | CS Required | UL BW | TXOP Sharing Mode | MU-MIMO HE-LTF Mode | Number Of HE-LTF Symbols And Midamble Periodicity |
| 4 | 12 | 1 | 1 | 2 | 2 | 1 | 3 |

(b) TXOP Sharing Mode subfield

| TXOP Sharing Mode subfield value | Description |
|---|---|
| 0 | No MU-RTS TXS Trigger frame |
| 1 | UL PPDU only |
| 2 | P2P PPDU allowed |
| 3 | Reserved |

*FIG. 15*

WIRELESS COMMUNICATION APPARATUS USING SHARED TXOP AND OPERATION METHOD FOR WIRELESS COMMUNICATION APPARATUS

CROSS-REFERENCE TO RELATED APPLICATIONS

This application is a continuation of International Patent Application No. PCT/KR2022/007430 filed on May 25, 2022, which claims the priority to Korean Patent Application No. 10-2021-0067239 filed in the Korean Intellectual Property Office on May 25, 2021, Korean Patent Application No. 10-2021-0150135 filed in the Korean Intellectual Property Office on Nov. 3, 2021, Korean Patent Application No. 10-2021-0155384 filed in the Korean Intellectual Property Office on Nov. 12, 2021, Korean Patent Application No. 10-2022-0026421 filed in the Korean Intellectual Property Office on Feb. 28, 2022, and Korean Patent Application No. 10-2022-0021796 filed in the Korean Intellectual Property Office on Feb. 18, 2022, the entire contents of which are incorporated herein by reference.

TECHNICAL FIELD

The present disclosure relates to a wireless communication apparatus using a shared TXOP and an operation method for a wireless communication apparatus.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present disclosure is to provide a wireless communication apparatus using a shared TXOP and an operation method of a wireless communication apparatus.

Solution to Problem

A non-access point (AP) station for communicating with an AP according to an embodiment of the present disclosure may include a transceiver and a processor. The processor receives a first PPDU including a multi user-request to send (MU-RTS) TXOP sharing (TXS) trigger frame from the AP by using the transceiver, the MU-RTS TXS trigger frame allocating a shared TXOP corresponding to a part of a TXOP acquired by the AP to the non-AP station, transmits a second PPDU including a CTS frame to the AP by using the transceiver as a response to the MU-RTS TXS frame, and transmits a third PPDU within the shared TXOP by using the transceiver.

The processor may transmit the third PPDU in a bandwidth identical to or narrower than that of the second PPDU.

CH_BANDWIDTH or CH_BANDWIDTH_IN_NON_HT of TXVECTOR of the third PPDU may be configured to have a value equal to or smaller than that of CH_BANDWIDTH_IN_NON_HT of TXVECTOR of the second PPDU.

The processor may transmit the third PPDU based on a subchannel that is most recently designated to be disabled by the AP.

The processor may configure, to be 1, a bit corresponding to a subchannel that is most recently designated to be disabled by the AP among bits of INACTIVE_SUBCHANNELS of TXVECTOR of the third PPDU.

The processor may configure a parameter for a frequency band of the third PPDU based on whether a non-HT PPDU exchange has been performed in the shared TXOP before transmission of the third PPDU.

The parameter for the frequency band may include CH_BANDWIDTH of TXVECTOR. The processor may configure CH_BANDWIDTH or CH_BANDWIDTH_IN_NON_HT of TXVECTOR of the third PPDU to be a bandwidth that is identical to or narrower than CH_BANDWIDTH_IN_NON_HT of RXVECTOR of a non-HT PPDU received before transmission of the third PPDU if the non-HT PPDU exchange has been performed in the shared TXOP before transmission of the third PPDU. In addition, the processor may configure CH_BANDWIDTH or CH_BANDWIDTH_IN_NON_HT of TXVECTOR of the third PPDU to be a bandwidth that is identical or narrower than CH_BANDWIDTH or CH_BAHDWIDTH_IN_NON_HT of TXVECTOR of the second PPDU if no non-HT PPDU exchange has been performed in the shared TXOP before transmission of the third PPDU.

The non-HT PPDU exchange in the shared TXOP before transmission of the third PPDU may correspond to an exchange of a non-HT PPDU including an RTS frame and a non-HT PPDU including a CTS frame.

The third PPDU may correspond to a P2P PPDU transmitted to a P2P peer station of the non-AP station.

A value of a duration field of the MU-RTS TXS frame may be configured based on a transmission time point of the second PPDU.

The third PPDU may correspond to a P2P PPDU transmitted to a P2P peer station of the non-AP station.

The processor may transmit, to the P2P peer station, an RST frame having a MAC address of the AP as a transmitter address before transmitting the third PPDU.

An operation method of a non-AP station for communicating with an AP according to an embodiment of the present disclosure may include: receiving a first PPDU including a multi user-request to send (MU-RTS) TXOP sharing (TXS) trigger frame from the AP, the MU-RTS TXS trigger frame allocating a shared TXOP corresponding to a part of a TXOP acquired by the AP to the non-AP station; transmitting a second PPDU including a CTS frame to the AP as a response to the MU-RTS TXS frame; and transmitting a third PPDU within the shared TXOP.

The transmitting the third PPDU within the shared TXOP may include transmitting the third PPDU in a bandwidth identical to or narrower than a bandwidth of the second PPDU.

The transmitting the third PPDU in the bandwidth identical to or narrower than the bandwidth of the second PPDU may include configuring CH_BANDWIDTH or CH_BANDWIDTH_IN_NON_HT of TXVECTOR of the third PPDU to have a value equal to or smaller than that of CH_BANDWIDTH_IN_NON_HT of TXVECTOR of the second PPDU.

The transmitting the third PPDU within the shared TXOP may include transmitting the third PPDU based on a subchannel that is most recently designated to be disabled by the AP.

The transmitting the third PPDU based on the subchannel that is most recently designated to be disabled by the AP may include configuring, to be 1, a bit corresponding to a subchannel that is most recently designated to be disabled by the AP among bits of INACTIVE_SUBCHANNELS of TXVECTOR of the third PPDU.

The transmitting the third PPDU within the shared TXOP may include configuring a parameter for a frequency band of the third PPDU based on whether a non-HT PPDU exchange has been performed in the shared TXOP before transmission of the third PPDU.

The parameter for the frequency band may include CH_BANDWIDTH of TXVECTOR. In this case, the configuring of the parameter for the frequency band of the third PPDU based on the whether the non-HT PPDU exchange has been performed in the shared TXOP before transmission of the third PPDU may include: configuring CH_BANDWIDTH or CH_BANDWIDTH_IN_NON_HT of TXVECTOR of the third PPDU to be a bandwidth that is identical to or narrower than CH_BANDWIDTH_IN_NON_HT of RXVECTOR of a non-HT PPDU received before transmission of the third PPDU if the non-HT PPDU exchange has been performed in the shared TXOP before transmission of the third PPDU; and configuring CH_BANDWIDTH or CH_BANDWIDTH_IN_NON_HT of TXVECTOR of the third PPDU to be a bandwidth that is identical or narrower than CH_BANDWIDTH or CH_BANDWIDTH_IN_NON_HT of TXVECTOR of the second PPDU if no non-HT PPDU exchange has been performed in the shared TXOP before transmission of the third PPDU.

The non-HT PPDU exchange in the shared TXOP before transmission of the third PPDU may correspond to an exchange of a non-HT PPDU including an RTS frame and a non-HT PPDU including a CTS frame The third PPDU may correspond to a P2P PPDU transmitted to a P2P peer station of the non-AP station.

Advantageous Effects of Invention

An embodiment of the present disclosure provides a wireless communication apparatus using a shared TXOP and an operation method of a wireless communication apparatus.

BRIEF DESCRIPTION OF DRAWINGS

FIG. 15 illustrates a format of an MU-RTS TXS frame according to an embodiment of the present disclosure.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
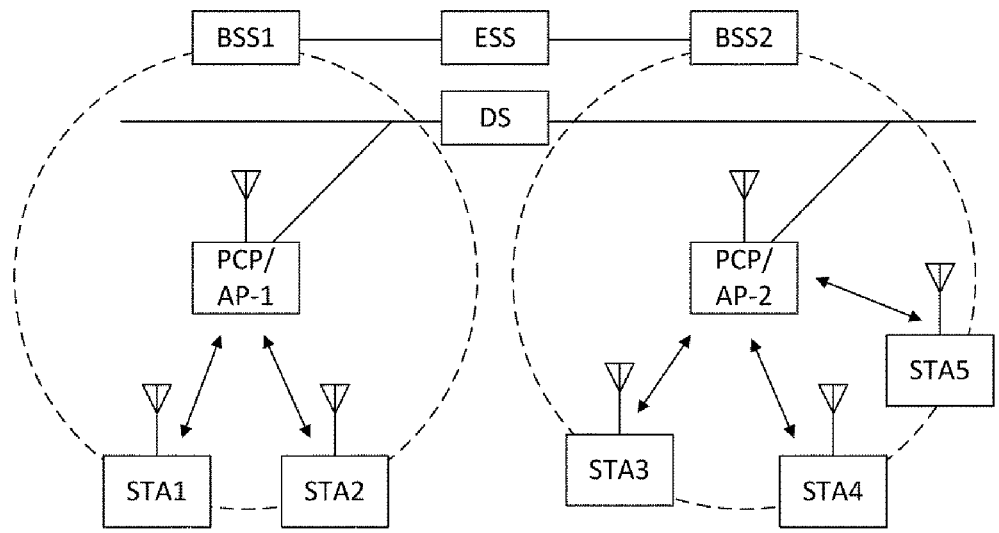
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
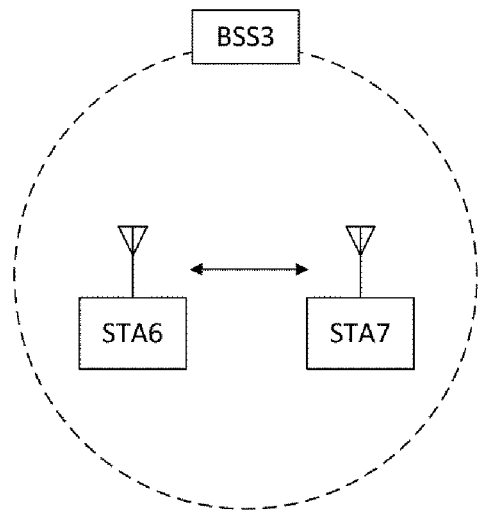
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
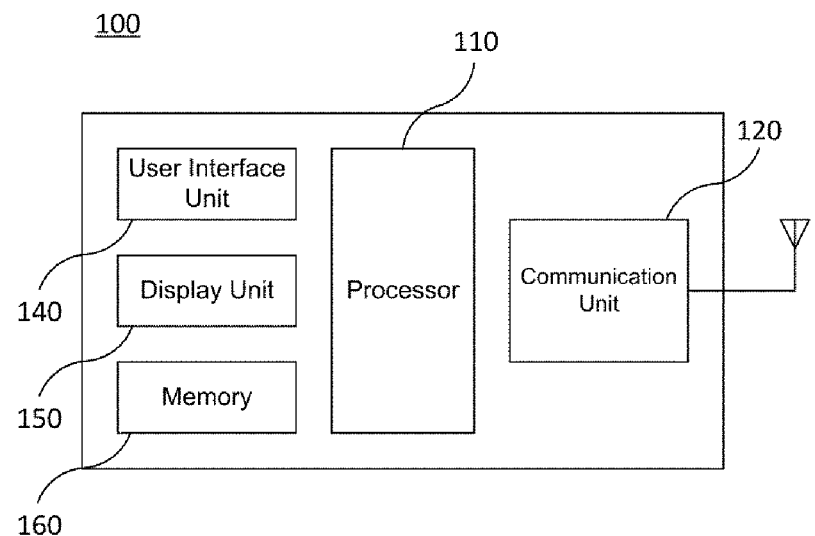
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
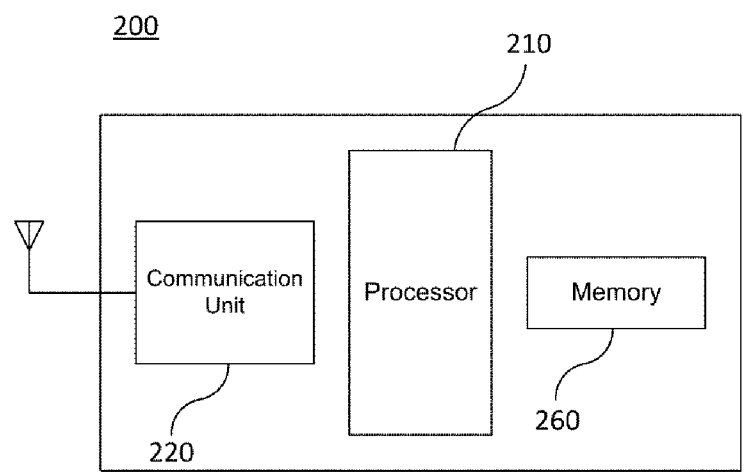
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
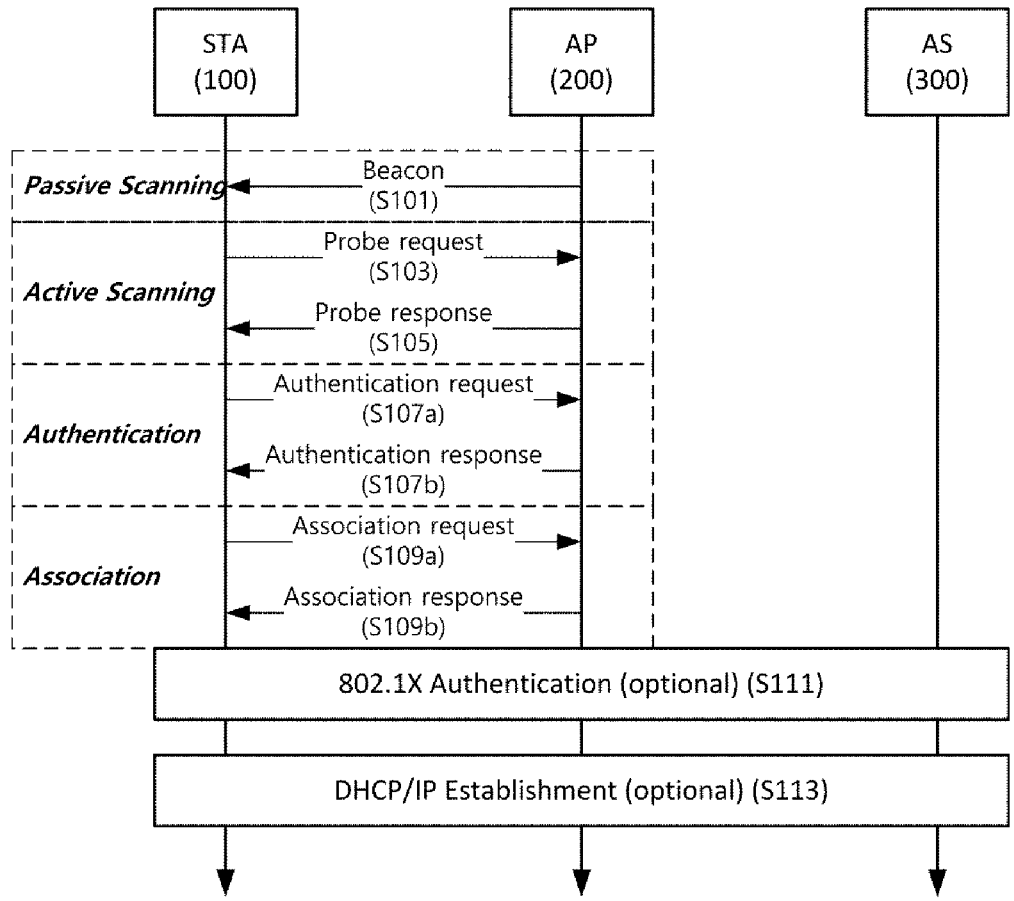
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
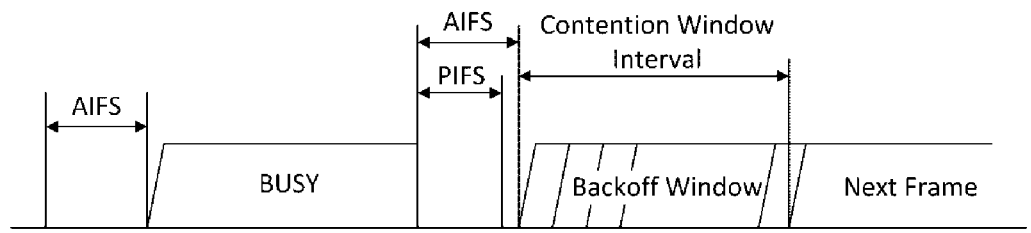
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this instance, a random number is referred to as a backoff counter. That is, the initial value of the backoff counter may be set by an integer number which is a random number that a UE obtains. In the case that the UE detects that a channel is idle during a slot time, the UE may decrease the backoff counter by 1. In addition, in the case that the backoff counter reaches 0, the UE may be allowed to perform channel access in a corresponding channel. Therefore, in the case that a channel is idle during an AIFS time and the slot time of the backoff counter, transmission by the UE may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Examples of Various PPDU Formats

Figure 7:
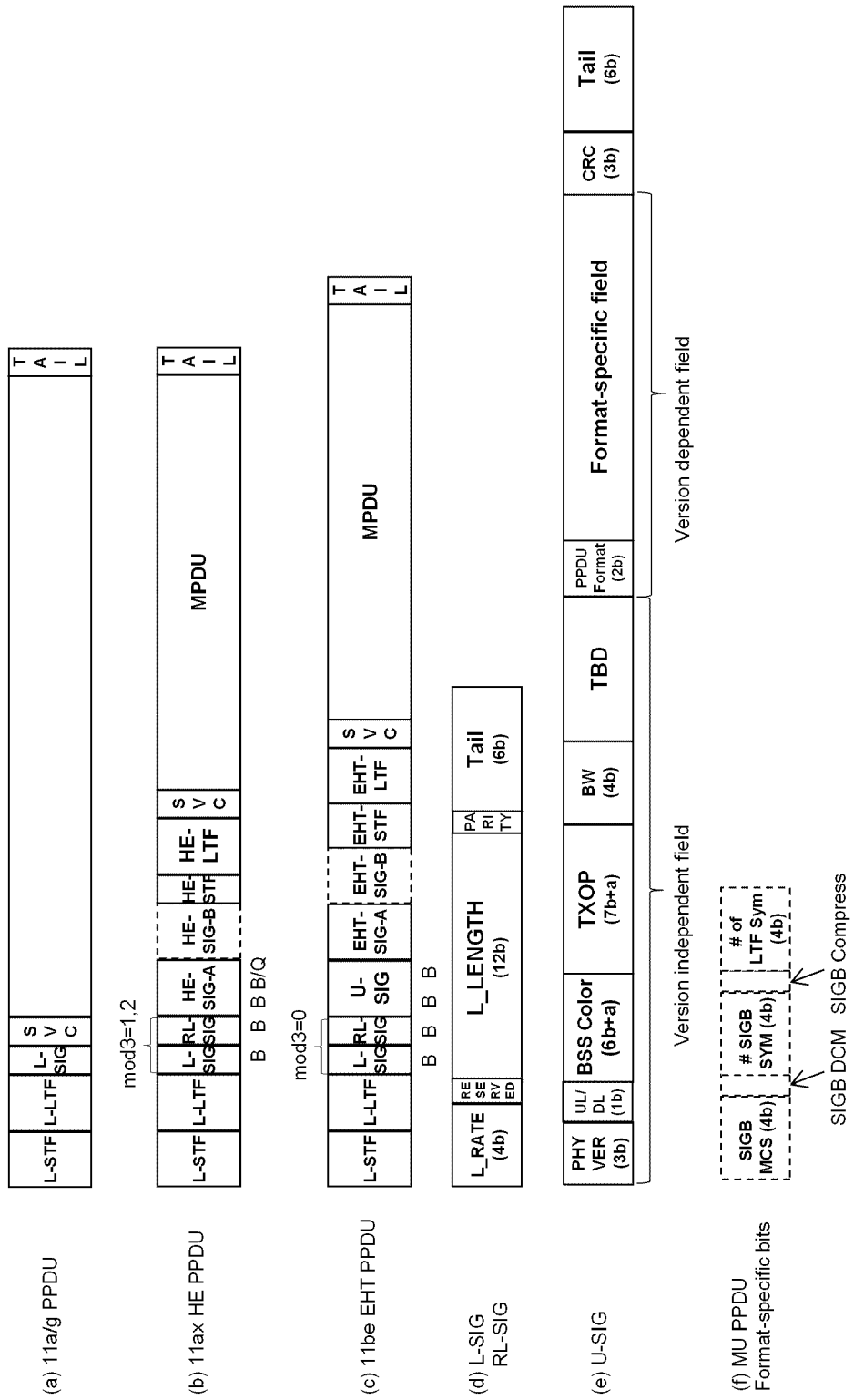
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, (a) of FIG. 7 illustrates an embodiment of a legacy PPDU format based on 802.11a/g, (b) of FIG. 7 illustrates an embodiment of an HE PPDU format based on 802.11ax, and (c) of FIG. 7 illustrates an embodiment of a non-legacy PPDU (i.e., EHT PPDU) format based on 802.11be. (d) of FIG. 7 illustrates detailed field configurations of RL-SIG and L-SIG commonly used in the PPDU formats.

Referring to (a) of FIG. 7, a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to (b) of FIG. 7, a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to (c) of FIG. 7, a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. (d) of FIG. 7 illustrates a 24-bit information configuration of L-SIG.

Referring to (d) of FIG. 7, the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(\text{us}) = \left(\left\lceil \frac{L\_LENGTH + 3}{3} \right\rceil\right) \times 4 + 20 \qquad [\text{Equation 1}]$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(\text{byte}) = \left(\left\lceil \frac{TXTIME - 20}{4} \right\rceil\right) \times 3 - 3 \qquad [\text{Equation 2}]$$

Herein, TXTIME is the total transmission time constituting the corresponding PPDU, and is expressed by Equation 3 below. In this case, TX represents the transmission time of X.

$$TXTIME(\text{us}) = \qquad [\text{Equation 3}]$$
$$T_{L-STF} + T_{L-LTF} + T_{L-SIG} + T_{RL-SIG} + T_{U-SIG} + (T_{EHT-SIG-A}) +$$
$$(T_{EHT-SIG-B}) + T_{EHT-STF} + N_{EHT-LTF} \cdot T_{EHT-LTF} + T_{DATA}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to (e) of FIG. 7, a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz subchannel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

(f) of FIG. 7 illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
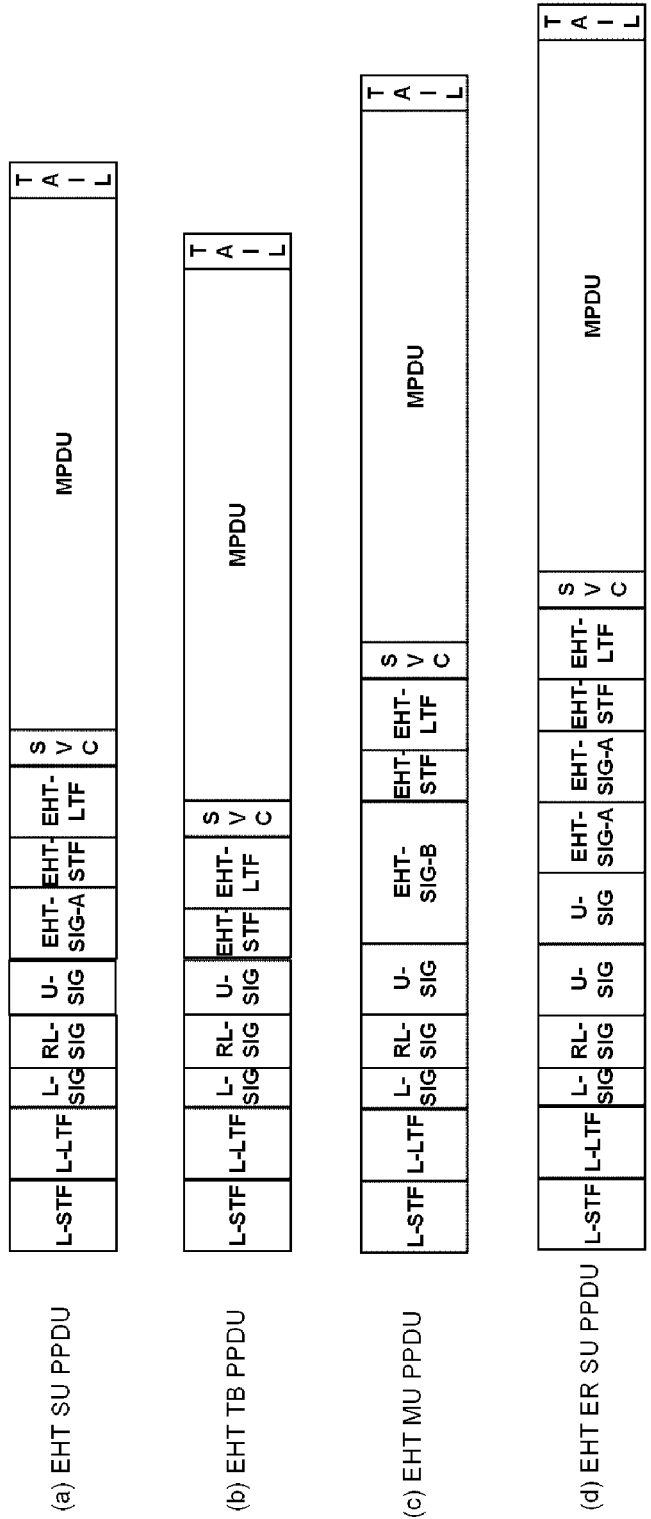
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

(a) of FIG. 8 shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

(b) of FIG. 8 shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

(c) of FIG. 8 shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

(d) of FIG. 8 shows an example of an EHT ER SU PPDU format used for single user transmission with an STA in an extended range. An EHT ER SU PPDU may be used for single user transmission with an STA of a wider range compared to the EHT SU PPDU described in (a) of FIG. 8, and a U-SIG field may be repeatedly located on a time axis.

The EHT MU PPDU described in (c) of FIG. 8 may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, in this specification, a frame or a MAC frame may be used interchangeably with an MPDU.

<Channel Access Method of Wi-Fi Terminal>

A Wi-Fi terminal (AP and non-AP station) performs channel sensing to determine whether a channel is idle before performing transmission of a frame. This is because the Wi-Fi terminal performs communication in an unlicensed-band commonly used with other devices. Such a channel access operation will be described through FIG. 6. Such channel access operation is applied to distributed coordination (DCF) and enhanced distributed channel access (EDCAF) defined in the standard of IEEE 802.11.

In the DCF and EDCAF channel access, a station determines a channel state by performing not only physical carrier sensing (CS) but also virtual carrier sensing. When it is determined through any one of the physical carrier sensing or the virtual carrier sensing that a channel is busy, the station determines that the channel is busy. In the virtual channel sensing, the station determines that the channel is busy if a value of a network allocation vector (NAV) is not 0. The NAV may have a value maintained for future traffic predicted for occupancy of a wireless medium. Specifically, the NAV is maintained by each station, and the NAV may be a time interval in which each station initiates no transmission in the corresponding wireless medium regardless of whether the corresponding wireless medium is idle. The value of the NAV decreases over time. When the value of the NAV is 0, in the virtual channel sensing, the station determines that the corresponding channel is idle. The NAV may be configured through a RTS frame/CTS frame exchange. Specifically, in the RTS frame/CTS frame exchange, the NAV may be configured based on a value of a duration field of the RTS frame and a value of a duration field of the CTS frame. In addition, the NAV may be also configured based on a value of a duration field of other MAC frame, in addition to the RTS frame/CTS frame exchange.

<EDCA and TXOP>

The EDCA differentiates and manages traffic in four access categories (ACs) according to characteristics of the traffic. The four ACs includes AC voice (AC_VO), AC video (AC_VI), AC best effort (AC_BE), and AC background (AC_BK). A channel access parameter may be configured according to AC. Specifically, four Acs may have different channel access parameters. In addition, the channel access parameter may include one of parameters relating to a CW, a TROP, and an AIFSN used in a backoff operation. Accordingly, an AC-specific traffic channel access priority may be managed. In the EDCA, traffic (MSDU) may be mapped to one of the four ACs according to a traffic category or a traffic stream of traffic. In the EDCA, four queues are mapped to four ACs, respectively, and the traffic is managed in a queue corresponding to an AC of the traffic. In this case, the four queues may be queues which are physically divided, or queues which are not physically divided but are logically divided.

AC_VO may be an AC for traffic which has not a large absolute amount but is venerable to a transmission delay, such as voice traffic. AC_VO may have relatively small CW-related parameter and AIFSN parameter values to increase a probability that the traffic is serviced in preference to traffic of other ACs. However, a TXOP parameter of AC_VO is limited to have a relatively smaller value than a TXOP parameter of other AC, and thus only a shorter transmission time than other AC may be secured.

AC_VI is an AC for traffic which is more robust to a transmission delay than the voice traffic, but requires low latency transmission and processing of a large amount of traffic, such as a video. AC_VI may have CW-related parameter and AIFSN parameter values greater than those of AC_VO but smaller than those of other ACs. A TXOP parameter of AC_VI is about twice as long as AC_VI.

AC_BE is an AC for traffic which is robust to a transmission delay, and most normal traffic except for voice data or streaming video data may be classified as AC_BE. The CW-related parameter and AIFSN parameter of AC_BE may have values greater than the CW-related parameter and AIFSN parameter values of AC_VO and AC_VI. In addition, AC_BE does not have a separate TXOP parameter, and accordingly, cannot perform a TXOP sequence in which a station receives an ACK after transmitting a PPDU including traffic corresponding to AC_BE, and then transmits a PPDU including traffic corresponding to AC_BE again after an SIFS.

AC_BK is an AC for traffic which is robust to a transmission delay, similar to AC_BE, but has a lower priority than traffic corresponding to AC_BE. AC_BK utilizes the same CW parameter value as AC_BE, and utilizes a larger AIFSN parameter value than AC_BE. In addition, a TXOP transmission sequence in which a station receives an ACK after transmitting a PPDU including traffic corresponding to AC_BK, and then transmits a PPDU including traffic corresponding to AC_BK again after an SIFS cannot be utilized.

The four EDCA ACs are mapped with user priorities (UPs) of 802.1D, and the EDCA AC is determined according to an UP value of wiredly received traffic, or a TID of the MSDU, indicated from an upper layer. In this case, when the TID of the MSDU indicates values of 0 to 7, values indicated by the TID may correspond to UPs one-to-one.

In addition, a default CW-related parameter (CWmin and CWmax), an AIFSN parameter, and a TXOP parameter of each the four EDCA ACs are defined in IEEE 802.11ax, and a parameter value of each AC may be changed by an AP. Accordingly, different BSSs may have different default CW-related parameters (CWmin, CWmax), AIFSN parameters, and TXOP parameters from each other.

Through utilization of the EDCA mechanism, Wi-Fi traffic is stored in one of four queues corresponding to four ACs, respectively, and may be transmitted to a destination device only when an AC of the traffic successfully performs channel access upon channel access contention with other ACs. In this case, in channel access contention among ACs, the respective ACs perform channel access contention according to channel access parameters (CW[AC] and AIFSN [AC]) of the respective ACs. The channel access contention operation performed by the respective ACs are identical to DCF. In this case, when no traffic to be transmitted is stored in an AC, the AC may not participate in channel access contention. The CW-related parameter and AIFSN parameter values may vary for each AC, and thus there is a high probability that AC_VO having the smallest CW and AIFSN parameter values successfully performs channel access upon channel access contention with other ACs. Accordingly, there is high possibility that traffic of AC_VO is serviced in preference to traffic of other ACs.

As described above, the EDCA configures a channel access priority according to an AC of traffic (frame, packet, etc.) for reinforcement of QoS, and provides an EDCA transmission opportunity (EDCA TXOP) function. An EDCA TXOP corresponds to a time interval in which an EDCA function (EDCAF) of an AC can adjust a wireless medium without interruption from other device during a TXOP duration when the EDCAF acquires a channel access opportunity and becomes a TXOP holder. In this case, the EDCA TXOP may be limited by a TXOP limit advertised by an AP, and the TXOP holder needs to perform transmission so that transmission of the TXOP holder within the TXOP limit and transmission of a response frame transmitted due to the transmission of the TXOP holder can be terminated.

The TXOP holder may transmit multiple frames (multiple PPDUs) during the EDCA TXOP duration, and the TXOP holder may consecutively transmit, in the TXOP duration, the multiple frames without performing a separate channel access procedure (for example, a backoff procedure) between transmission of the respective frames. In this case, when the multiple frames correspond to an MPDU or an aggregated MAC protocol data unit (A-MPDU) not requesting an immediate ACK, the transmission of the multiple frames may be performed at an interval of a short interframe space (SIFS) or a reduced interframe space (RIFS). In this case, when an MPDU requesting an immediate ACK or an A-MPDU requesting an immediate ACK is included in the multiple frames, the TXOP holder may receive an ACK after transmitting a frame for requesting the immediate ACK, and transmit the next frame after an SIFS.

In this case, if a pre-designated condition is satisfied, the TXOP holder may also transmit, within the TXOP, traffic of an AC other than the AC used for acquisition of the TXOP. Specifically, the TXOP holder may also transmit, within the TXOP through TXOP sharing, traffic of an AC other than the AC used for acquisition of the TXOP.

As described above, the TXOP holder may perform consecutive frame transmission without performing a separate channel access procedure within the TXOP. To this end, channel access by other terminal within the TXOP duration needs to be prevented. Accordingly, the TXOP holder may advertise the acquired TXOP duration.

A station which corresponds to a TXOP holder or initiates transmission after completing a channel access procedure may notify other station of the TXOP duration by transmitting an RTS frame. In this case, the RTS frame is a frame having type subfields of a frame control field (the third bit (B2) and the fourth bit (B3) of a frame control field) of a MAC frame header, which are configured to be 012b, and subtype subfields of a frame control field (the fifth to eight bits (B4-B7) of a frame control field), which are configured to be 10112b. A terminal having received the RTS frame from the TXOP holder may configure a NAV based on information related to a duration included in the RTS frame, for example, a value of a duration field. The configured NAV may be maintained to be a value other than 0 for a time interval corresponding to a TXOP of the TXOP holder. A station indicated as a destination device of the RTS frame needs to respond with a CTS frame to the RTS frame, instead of configuring the NAV based on information on a duration of the RTS frame. In this case, the destination device of the RTS frame transmitted to initiate the TXOP is a TXOP responder, and needs to transmit a CTS frame as a response to the RTS frame. In this case, an interval (space) between the RTS frame and the CTS frame is an SIFS. In this case, a duration field of the CTS frame is configured to be a value calculated according to (a value indicated in the duration field of the received RTS frame—CTS frame transmission time—SIFS). Terminals having received the CTS frame may configure a NAV based on information related to a duration included in the CTS frame. The NAVs of a terminal having received the RTS frame from the TXOP holder and a terminal having received the CTS frame from the TXOP responder are configured to be 0 after termination of the TXOP acquired by the TXOP holder. Accordingly, a Wi-Fi MAC mechanism enables the TXOP holder and the TXOP responder exchange multiple frames for the TXOP without interruption.

However, when the TXOP holder transmits the RTS frame to a non-HT duplicate PPDU in a primary 80 MHZ band but the CTS frame (non-HT duplicate PPDU) transmitted as a response by the TXOP responder is transmitted only in a primary 40 MHz band. The TXOP holder may use only a bandwidth of primary 40 MHz or less (i.e., primary 20 MHz) during the acquired TXOP for a frame exchange. That is, the TXOP holder needs to configure CH_BANDWIDTH (a type of a TXVECTOR parameter) of the transmitted PPDU to have a value equal to or greater than that of CH_BANDWIDTH or CH_BANDWIDTH_IN_NON-HT (a type of an RXVECTOR parameter) of the PPDU including the received CTS frame. In this case, the RTS frame may be an RTS frame enabling responding with a CTS frame in a BW smaller than a BW in which the RTS frame is transmitted. That is, the RTS frame may be an RTS frame transmitted while DYN_BANDWIDTH_IN_NON_HT of TXVECTOR is configured to be dynamic. If DYN_BANDWIDTH_IN_ NON_HT is configured to be static and the RTS frame is transmitted from the TXOP holder, the TXOP responder may need to transmit the CTS frame in a frequency band (BW) in which the RTS frame is received.

Figure 9:
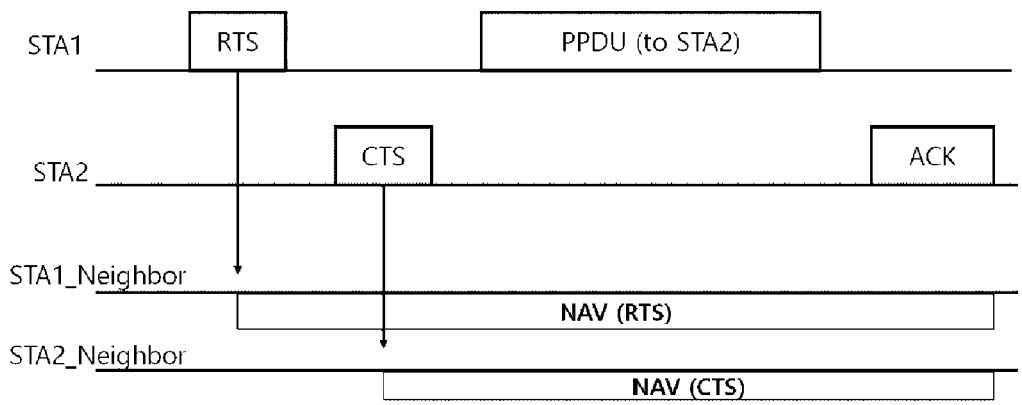
FIG. 9 illustrates a TXOP protection method through an exchange of an RTS frame and a CTS frame.

FIG. 9 illustrates a TXOP protection method through an exchange of an RTS frame and a CTS frame.

In FIG. 9, a first station STAT transmits an RTS frame to a second station STA2 corresponding to a destination device of a PPDU before transmitting the PPDU, and the second station STA2 determines that the received RTS frame is an RTS frame, the destination device of which is considered as the second station itself, and responds with a CTS frame to the first station STA1.

A first neighbor station STA1 Neighbor corresponding to a neighbor station of the first station STA1 receives the RTS frame transmitted by the first station STA1, and then configures a NAV to be a value of a duration field of the RTS frame. A second neighbor station STA2 Neighbor corresponding to a neighbor station of the second station STA2 receives the CTS frame transmitted by the second station STA2, and then configures a NAV based on a value of a duration field of the CTS frame. The first neighbor station STA1 Neighbor and the second neighbor station STA2 Neighbor determine in virtual carrier sensing that a channel is busy while the NAV configured after receiving the RTS frame or the CTS frame is maintained to be a value other than 0, and perform an operation of reducing no backoff counter, etc. Consequently, neighbor terminals having received the RTS frame or the CTS frame do not attempt transmission while the NAV is maintained to be a value other than 0, and thus the first station STA1 and the second station STA2 may not be interrupted by the neighbor terminals while transmitting/receiving a PPDU and an ACK frame.

Even though the first station STA1 and the second neighbor station STA2 Neighbor are hidden nodes, the second neighbor station STA2 Neighbor may perform an operation in consideration that the channel is busy while the first station STAT transmits the PPDU.

<TXOP Protection Using MU-RTS Trigger Frame>

In 11ax (sixth-generation Wi-Fi, Wi-Fi 6, or high efficiency WLAN (HEW)), an AP may initiate a TXOP by using an MU-RTS frame and a TXOP frame exchange procedure may be protected through definition of a procedure of exchanging an MU-TRS trigger (hereinafter, an MU-RTS frame) and a CTS frame. The MU-RTS frame is a type of a trigger frame. When a station receives an MU-RTS Frame and a user field of the MU-RTS frame indicates AID12 (LSB 12 bits of an association ID) of the station, the station transmits a CTS frame as a response to the MU-RTS frame. In this case, multiple frames may simultaneously transmit the CTS frame. When the AP performs TXOP protection using the MU-RTS frame, the multiple stations may respond with the CTS frame, and thus a TXOP can be protected by a neighbor station of each of the multiple stations, which corresponds to a destination device of a downlink multi-user PPDU (DL MU PPDU). In addition, the MU-RTS frame may be used to protect a UL MU PPDU. Specifically, before requesting a trigger-based (TB) PPDU from the multiple stations through the trigger frame, the AP may transmit the MU-RTS frame so as to enable the multiple stations for responding with TB PPDUs to transmit CTS frames. In this case, the CTS frames transmitted by the multiple stations as a response cause configuration of a NAV for the neighbor station of each station the NAV protecting a TB PPDU or an ACK frame (for example, ack or block ack) to be transmitted after the TB PPDU. Through this, a legacy station which cannot decode the trigger frame and the TB PPDU may not perform channel access during a frame exchange sequence initiated by the trigger frame (or a TXOP in which the trigger frame is transmitted).

Figure 10:
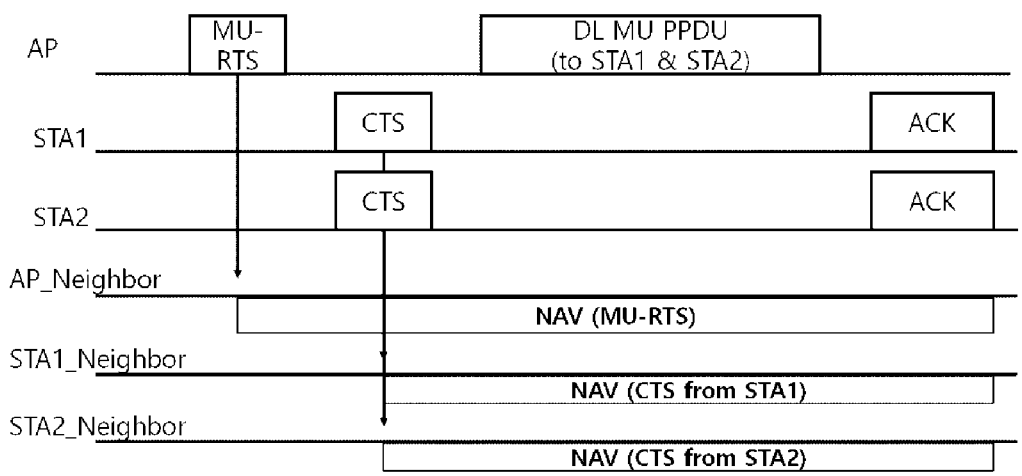
FIG. 10 illustrates a TXOP protection method using an MU-RTS frame and a CTS frame.

FIG. 10 illustrates a TXOP protection method using an MU-RTS frame and a CTS frame.

In FIG. 10, an AP transmits an MU-RTS frame to a first station STA1 and a second station STA2 each corresponding to a destination device of an MU PPDU before transmitting the MU PPDU, and each of the first station STA1 and the second station STA2 receives the MU-RTS frame and transmits a CTS frame as a response to the MU-RTS frame after an SIFS.

A first neighbor station STA1 Neighbor corresponding to a neighbor station of the first station STA1 receives a CTS frame transmitted by the first station STA1 and then configures a NAV based on a value of a duration field of the CTS frame. A second neighbor station STA2 Neighbor corresponding to a neighbor station of the second station STA2 receives a CTS frame transmitted by the second station STA2, and then configures a NAV based on a value of a duration field of the CTS frame. The first neighbor station STA1_Neighbor and the second neighbor station STA2_Neighbor determine in virtual carrier sensing that a channel is busy while the NAV configured after receiving the CTS frame is maintained to be a value other than 0, and perform an operation of reducing no backoff counter, etc. Accordingly, a station having received the CTS frame does not attempt transmission while the NAV is maintained as a value other than 0, and thus there may be no interruption by the neighbor station while the AP transmits the MU PPDU and the first station STA1 and the second station STA2 respond with ACK frames.

A trigger frame is a frame type defined in IEEE 802.11ax, and a frame having a type subfield and a subtype subfield of a frame control field, configured to be 012b and 00102b, respectively. The value 012b of the type subfield of the frame control field indicates a control type, and the value 00102b of the subtype subfield indicates a trigger frame. In IEEE 802.11ax, an AP defines a trigger frame to simultaneously request response frames from multiple station. An MU-RTS frame is used to request CTS frames from multiple STAs (non-AP STAs). A trigger type except for the MU-RTS frame includes a basic trigger frame for requesting a UL MU PPDU, a beamforming report poll trigger frame for requesting a beamforming report, an MU-BAR trigger frame for requesting a BlockAck, a buffer status report poll trigger frame for requesting a buffer status report, a GCR MU-BAR trigger frame, a bandwidth query report poll trigger frame, and an NDP feedback report poll trigger frame. The format of the trigger frame is described through FIGS. 11 to 13.

Figure 11:
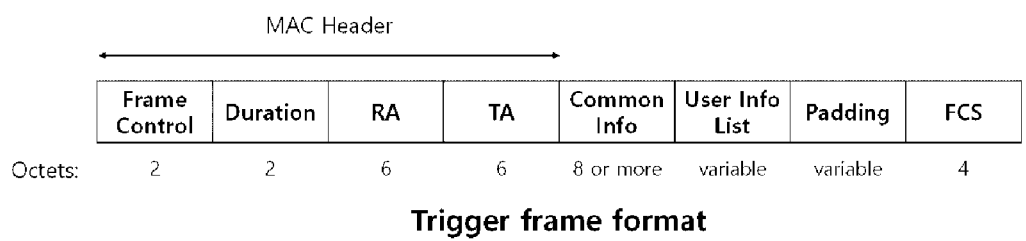
FIG. 11 illustrates a format of a trigger frame according to an embodiment of the present disclosure.

FIG. 11 illustrates a format of a trigger frame according to an embodiment of the present disclosure.

A trigger frame includes a MAC header including a frame control field, a common info field, a user info list field, a padding field, and an FCS field.

The frame control field includes type and subtype subfields, and the trigger frame has two subfields configured to be 012b and 00102b, respectively.

The common info field includes a trigger type subfield for indicating the type of a trigger frame, and a UL length subfield and multiple fields for indicating the length of responding UL transmission. A specific format of the common info field is described through FIG. 12.

The user info list field may include one or more user info fields including information for indicating a destination device of the trigger frame. In this case, the user info field includes, according to the type of the trigger frame, a parameter, for example, a UL DCM, a UL MCS, etc., which needs to be used when the destination device transmits a response frame after receiving the trigger frame, in addition to information indicating the designation device. A specific format of the user info field is described through FIG. 13.

The padding field is configured to secure time for the destination device of the trigger frame to prepare for a response frame after the station receives the trigger frame. An AP for transmitting the trigger frame may adjust the length of the padding field in consideration of the performance of destination devices. In addition, in IEEE 802.11be (Wi-Fi 7 or EHT), the length of the padding field may be adjusted so that an end time of a PPDU including the trigger frame is aligned with that of other PPDU.

The frame check sequence (FCS) field includes a 32-bit cyclic redundancy code (CRC). In this case, the CRC is a value acquired based on a value of the MAC header and a value of a frame body field.

Figure 12:
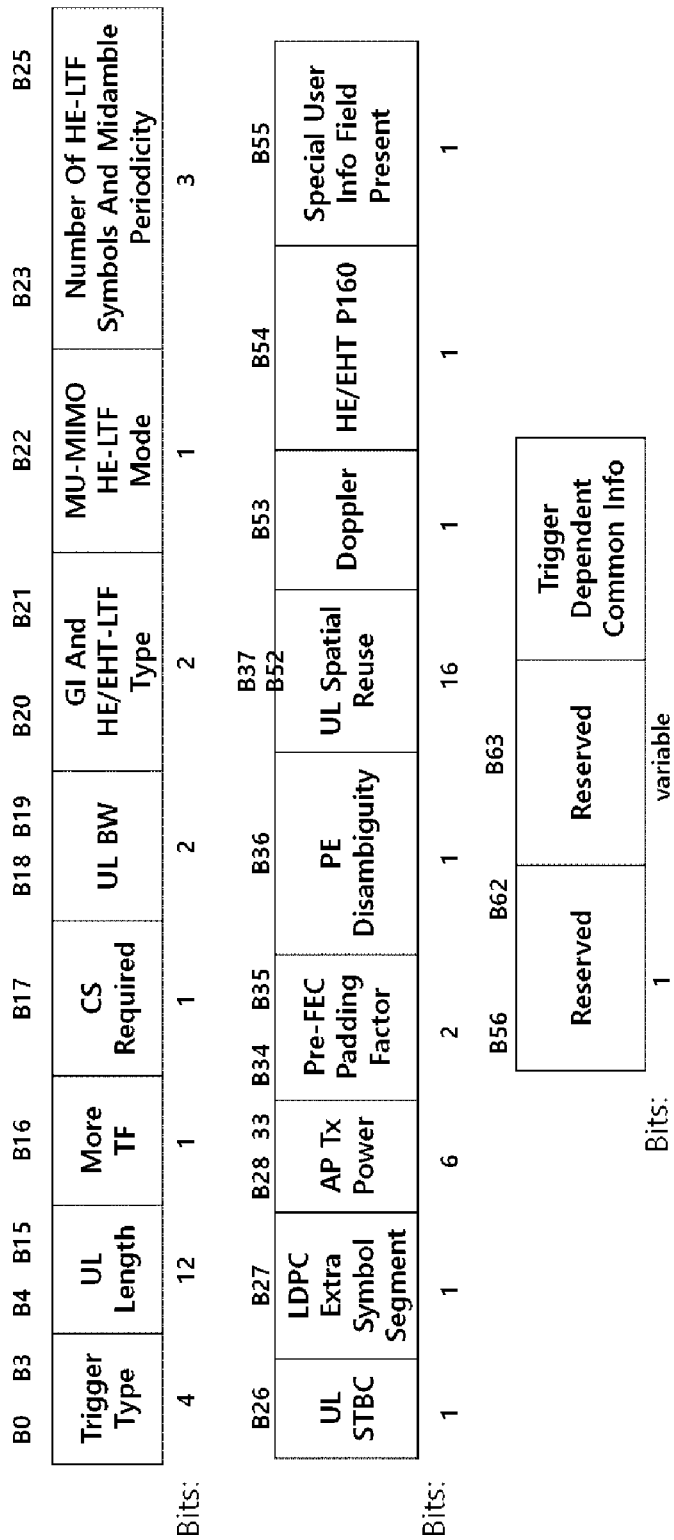
FIG. 12 illustrates a format of a common info field of a trigger frame according to an embodiment of the present disclosure.

FIG. 12 illustrates a format of a common info field of a trigger frame according to an embodiment of the present disclosure.

A trigger type subfield is utilized to indicate the type of a trigger frame, and when a value of the trigger type subfield is 0, the trigger type subfield indicates a basic trigger frame. When a value of the trigger type subfield is 1, the trigger type subfield indicates a BFRP frame. When a value of the trigger type subfield is 2, the trigger type subfield indicates an MU-BAR frame. When a value of the trigger type subfield is 3, the trigger type subfield indicates an MU-RTS frame. When a value of the trigger type subfield is 4, the trigger type subfield indicates a BSRP frame. When a value of the trigger type subfield is 5, the trigger type subfield indicates a GCR MU-BAR. When a value of the trigger type subfield is 6, the trigger type subfield indicates a BQRP frame. When a value of the trigger type subfield is 7, the trigger type subfield indicates an NDP feedback report poll (NFRP).

A UL length subfield indicates a value which needs to be configured for an L-SIG LENGTH field of a TB PPDU corresponding to a response to a trigger frame.

A more TF subfield indicates whether there is a trigger frame to be transmitted after a trigger frame.

A CS required subfield indicates whether a destination device of a trigger frame needs to perform CS when transmitting a response frame (physical & virtual CS, ED & NAV), and a station for transmitting the response frame after receiving the trigger frame having the CS required field indicated to be 1 needs to perform CS.

A UL BW subfield indicates a BW value that needs to be indicated through a preamble, for example, a HE-SIG-A field or a U-SIG field, by a station responding with a TB PPDU after receiving a trigger frame.

A GI and HE/EHT-LTF type subfield indicates guard interval (GI) and HE (EHT)-LTF values of a TB PPDU corresponding to a response to a trigger frame.

An MU-MIMO HE (EHT)-LTF mode subfield indicates information related to an HE (EHT)-LTF mode which needs to be applied to a TB PPDU corresponding to a response to a trigger frame.

A number of HE (EHT)-LTF symbols and midamble periodicity subfield indicates the number of HE (EHT)-LTF symbols which need to be applied to a TB PPDU when a doppler subfield is indicated to be 0, and indicates information on the number of HE (EHT)-LTF symbols and the periodicity of a midamble when the doppler subfield is indicated to be 1.

A UL STBC subfield indicates whether STBC encoding needs to be applied to a responding TB PPDU, and is configured to be 1 when the STBC encoding needs to be applied. However, the UL STBC subfield of the trigger frame for causing a response of the EHT TB PPDU is a reserved field.

An LDPC extra symbol segment subfield indicates whether an LDPC extra symbol segment needs to be included in a TB PPDU corresponding to a trigger frame, and the LDPC extra symbol segment needs to be included in the TB PPDU when the LDPC extra symbol segment subfield is indicated to be 1.

An AP Tx power subfield indicates a value related to transmission power of an AP used when a station transmits a trigger frame. When the station transmits a response frame, the station may adjust transmission power on the basis a value indicated in the AP Tx power subfield.

A pre-FEC padding factor and PE disambiguity subfield indicates information for clarifying the length of a packet extension (PE) and whether a pre-FEC padding factor is 1, 2, 3, or 4.

A UL spatial reuse subfield includes four spatial reuse subfields, and indicates a value to be configured for a spatial reuse field of an HE-SIG-A of an HE TB PPDU corresponding to a response to a trigger frame.

A doppler subfield indicates whether a midamble is included in a TB PPDU corresponding to a response to a trigger frame. A trigger frame for triggering transmission of an EHT TB PPDU may have a doppler subfield configured to be a reserved field. When the subfield is configured to be a reserved field, the station may operate without consideration of a value of the corresponding field.

An HE/ETH P160 subfield indicates, to a channel corresponding to P160 MHz, whether a trigger frame triggers transmission of a HE TB PPDU or triggers transmission of an EHT TB PPDU, with respect to a TB PPDU corresponding to a response to a trigger frame.

A special user info field present subfield indicates whether a user info field having an AID12 subfield indicated to be 2007 is included a user info field among user info fields.

A trigger dependent common info subfield is included only when the type of a trigger frame indicated through a trigger type field is a basic trigger frame or an NFRP trigger frame.

Figure 13:
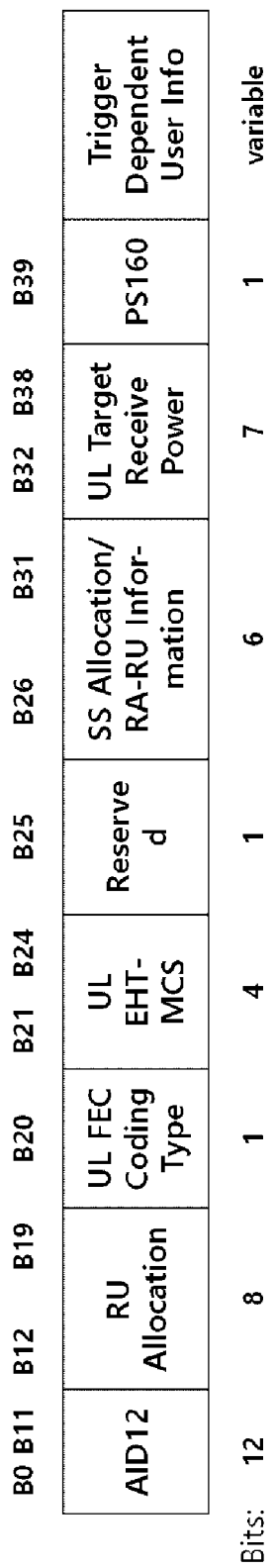
FIG. 13 illustrates a format of a user info field of a trigger frame according to an embodiment of the present disclosure.

FIG. 13 illustrates a format of a user info field of a trigger frame according to an embodiment of the present disclosure.

An AID12 subfield of a user info field indicates AID12 of a station corresponding to a user info field. When the user info field is for one station, the AID12 subfield may be configured to be 1 to 2006. When the trigger frame is an HE trigger frame and the user info field is for one station, the AID12 subfield may be configured to be 1 to 2007. When the user info field is for random access of a station associated with an AP, a value of the AID12 subfield may be configured to be 0. When the user info field is for random access of a station unassociated with an AP, a value of the AID12 subfield may be configured to be 2045 or 2044. When the value of the AID12 subfield is 2045, the value indicates that an HE TB PPDU needs to be transmitted through random access. When the value of the AID12 subfield is 2044, the value indicates that an EHT TB PPDU needs to be transmitted through random access. When the AID12 subfield is configured with a pre-configured value, the AID12 subfield may indicate that a padding field starts immediately after the AID12 subfield. In this case, the pre-configured value may be 4095 or 4094. When the value of the AID12 subfield is configured with 2046, the AID12 subfield may indicate that the user info field is for a resource unit (RU) that is not allocated to any station.

An RU allocation subfield of a trigger frame other than an MU-RTS frame indicates information on the size and the position of an RU/multiple-resource unit (MRU) allocated to a destination device of the user info field, i.e., a station indicated by the AID12 subfield. However, the RU allocation subfield of the MU-RTS frame indicates a channel through which the destination device of the user info field needs to transmit a CTS frame. The RU allocation subfield of the MU-RTS frame indicates a channel through which a destination station is to transmit a CTS frame. Specifically, the RU allocation subfield of the MU-RTS frame indicates a channel through which a CTS frame is transmitted among primary 20 MHz or primary 40 MHz, primary 80 MHz, primary 160 MHz, 80+80 MHz, and primary 320 MHz channels. In this case, the MRU indicates an RU obtained through association of two or more RUs, and may be defined as one of the sizes of 52+26-tone, 106+26-tone, 484+242-tone, 996+484-tone, 996+484+242-tone, 2×996+484-tone, 3×996, 3×996+484-tone, and 4×996-tone.

A UL FEC coding type subfield indicates a code type of a TB PPDU corresponding to a response to a trigger frame. When a value of the UE FEC coding type subfield is 0, the UL FEC coding type subfield indicates binary convolution coding (BCC). When a value of the UL FEC coding type subfield is 1, the UL FEC coding type subfield indicates low-density parity-check (LDPC).

A UL EHT-MCS subfield indicates an EHT-MCS which needs to be applied to a TB PPDU transmitted as a response to a trigger frame.

When the AID12 subfield indicates that the user info field is for random access, an SS allocation/RA-RU information subfield indicates RA-RU information. When the AID12 subfield indicates that the user info field is not for random access, the SS allocation/RA-RU information subfield indicates information on spatial stream allocation. Specifically, the SS allocation/RA-RU information subfield includes a starting spatial stream subfield corresponding to a 4-bit field and a number of spatial streams subfield corresponding to a 2-bit field.

A UL target receive power subfield indicates power of a signal of a TB PPDU transmitted as a response to a trigger frame, wherein the signal can be received at an antenna end of an AP. When a station transmits a TB PPDU, the station may adjust transmission power of the TB PPDU with a value of the UL target receive power subfield so that the AP receives the TB PPDU within the size of power indicated by UL target receive power.

A PS160 subfield indicates information related to the position and size of the RU/multiple-RU (MRU) allocated by the user info field.

<MU-RTS Frame Transmission and CTS Frame Responding Rule>

With regards to the format of an MU-RTS frame, one or more fields of the format of a basic trigger frame may be configured to be reserved. In a common info field of the MU-RTS frame, a UL length field, an MU-MIMO HE-LTF mode field, a number of HE-LTF symbols and midamble periodicity field, a UL STBC field, an LDPC extra symbol segment field, an AP Tx power field, a pre-FEC padding factor field, a PE disambiguity field, a UL spatial reuse field, and a doppler and UL HE-SIG-A2 reserved field may be configured to be reserved fields. A UL EHT-MCS field, a UL FEC coding type field, an SS allocation/RA-RU information field, and a UL target receive power field of the user info field of the MU-RTS frame may be configured to be reserved fields. This is because many parts of transmission parameters used when a CTS frame is transmitted as a response to the MU-RTS frame are designated in advance. Specifically, a station having received the MU-RTS frame may transmit the CTS frame at 6 Mbps by using a non-HT duplicate PPDU.

The station having received the MU-RTS frame may determine a subchannel through which the CTS frame is to be transmitted as follows. Specifically, the station may transmit the CTS frame only through an idle subchannel within the RU/MRU allocated by the MU-RTS frame. The RU/MRU allocated by the MU-RTS frame corresponds to an RU/MRU indicated by the RU allocation subfield of the user info field corresponding to the station of the MU-RTS frame. The station having received the MU-RTS frame may transmit the CTS frame in the MRU which can perform transmission.

For example, it may be determined that the MU-RTS frame allocates a primary 320 MHz frequency band to a station, and one channel among 16 subchannels included in the 320 MHz frequency band is not idle. In this case, there is no MRU including 15 subchannels, and thus the station transmits the CTS frame through 14 subchannels among 16 subchannels included in the 320 MHz frequency band. In this case, 14 subchannels may include 3×966+484-tone.

The station may determine a subchannel through which the CTS frame is transmitted as a response to the MU-RTS frame by determining whether the subchannel is a subchannel satisfying all the following conditions.

1. A subchannel is included in a frequency band allocated to a station by MU-RTS, i.e., indicated by an RU allocation subfield of a user info field corresponding to the station.
2. A subchannel is determined to be idle for an SIFS after a station receives a PPDU including an MU-RTS frame.

In this case, whether the subchannel is idle is determined based on virtual carrier sensing and energy detection (ED)-based CCA.
3. A subchannel is a subchannel through which an MU-RTS frame is received.
4. A subchannel includes a subcarrier of an MRU which can be transmitted by a station. In this case, the subchannel includes a primary channel.

When an MU-RTS frame triggers CTS frame transmission by multiple stations, the stations may transmit CTS frames in a subchannel satisfying all conditions 1 to 3 above. In this case, when the MU-RTS frame triggers CTS frame transmission by one station, the station may transmit a CTS frame in a subchannel satisfying all conditions 1 to 4 above.

The station may determine a subchannel through which the CTS frame is transmitted as a response to the RTS frame by determining whether the subchannel is a subchannel satisfying all the following conditions.
1. A subchannel is included in a frequency band corresponding to CH_BANDWIDTH or CH_BANDWIDTH_IN_NON_HT of RXVECTOR configured during RTS frame reception. For example, when a value of CH_BANDWIDTH or CH_BANDWIDTH_IN_NON_HT of RXVECTOR is 80 MHz, the subchannel needs to be included in a primary 80 MHz channel.
2. A subchannel is determined to be idle during a PIFS before reception of a PPDU including an RTS frame.
3. A subchannel is a subchannel through which an RTS frame is received.
4. A subchannel includes a subcarrier of an MRU which can be transmitted by a station. In this case, the subchannel includes a primary channel.

In the above-described embodiments, the CTS frame may be transmitted for each subchannel having a 20 MHz bandwidth. A specific embodiment of transmitting the CTS frame is described through FIG. 14.

In the description above, CH_BANDWIDTH of RXVECTOR is mentioned. CH_BANDWIDTH of RXVECTOR and CH_BANDWIDTH of TXVECTOR are described.

When a station performs transmission, CH_BANDWIDTH of TXVECTOR is one of TXVECTOR parameters of a PHY-TXSTART.request primitive issued from a MAC layer to a physical layer. CH_BANDWIDTH indicates a bandwidth of a frequency band in which a PPDU is transmitted. When the station performs transmission of a non-HT PPDU, CH_BANDWIDTH_IN_NON_HT also indicates a bandwidth of a frequency band in which a PPDU is transmitted. CH_BANDWIDTH_IN_NON_HT may have a value among CBW20/40/80/160/80+80/320. CH_BANDWIDTH may have a value among CBW20/40/80/160/80+80/320-1/320-2.

In addition, when a station performs reception, CH_BANDWIDTH of RXVECTOR is one of RXVECTOR parameters of a PHY-RXSTART.indication primitive issued from a physical layer to a MAC layer. In addition, when a PPDU is received in the physical layer, PHY-RXSTART.indication is generated. CH_BANDWIDTH indicates a bandwidth of a frequency band in which a PPDU is received. When the station performs reception of a non-HT PPDU, CH_BANDWIDTH_IN_NON_HT also indicates a bandwidth of a frequency band in which a PPDU is received. CH_BANDWIDTH_IN_NON_HT may have a value among CBW20/40/80/160/80+80/320. CH_BANDWIDTH may have a value among CBW20/40/80/160/80+80/320-1/320-2.

Figure 14:
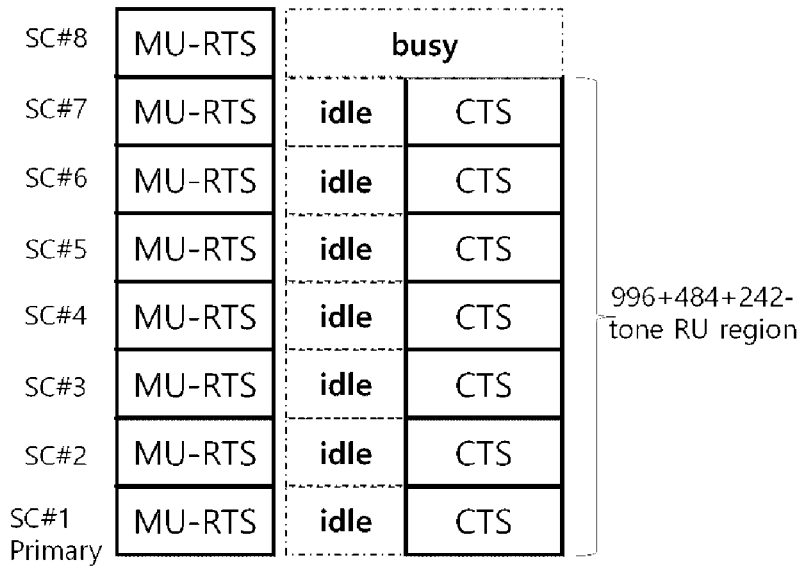
FIG. 14 illustrates a method of determining a subchannel through which a station is to transmit a CTS frame according to an embodiment of the present disclosure.
Figure 14:
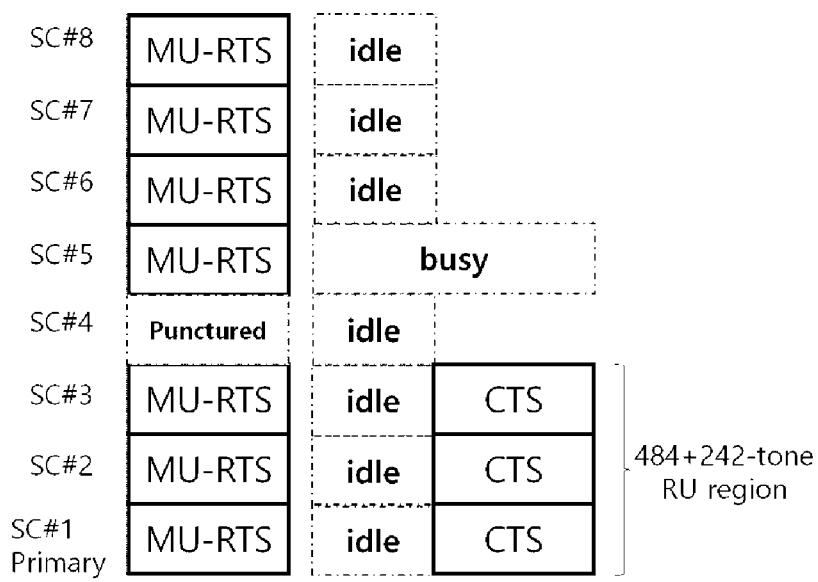

FIG. 14 illustrates a method of determining a subchannel through which a station is to transmit a CTS frame according to an embodiment of the present disclosure.

In FIG. (a) of 14, an MU-RTS frame is received through eight subchannels SC #1-SC #8. In this case, the MU-RTS frame may be transmitted through a 20 MHz non-HT PPDU. In another specific embodiment, the MU-RTS frame may be transmitted through a 160 MHz PPDU. A station indicated by an AID12 subfield of a user info field of the MU-RTS frame determines whether a CTS frame can be transmitted through a first subchannel SC #1 to an eighth subchannel SC #8 each corresponding to a subchannel indicated by an RU allocation subfield of the MU-RTS frame. The eighth subchannel SC #8 is not idle, and the first subchannel SC #1 to the seventh subchannel SC #7 are included in a 996+484+242-tone MRU. The station transmits the CTS frame by using a duplicated non-HT PPDU through the first subchannel SC #1 to the seven subchannel SCIO. The station may perform transmission in the 996+484-tone MRU, but if the transmission cannot be performed in the 996+484+242-tone MRU, the station transmits the CTS frame by using a duplicated non-HT PPDU in the first subchannel SC #1 to the sixth subchannel SC #6.

Referring to FIG. (b) of 14, the MU-RTS frame may be received through eight subchannels. The MU-RTS frame is received through seven subchannels SC #1-SC #3, SC #5, and SC #8. A station indicated by the AID12 subfield of the user info field of the MU-RTS frame determines whether the CTS frame can be transmitted through seven subchannels SC #1-SC #3, SC #5, and SC #5-SC #8 each corresponding to a subchannel indicated by the RU allocation subfield of the MU-RTS frame. The station determines whether the fifth subchannel SC #5 is not idle. An MRU having the largest bandwidth among the types of MRUs enabling the station to perform transmission through the seven subchannels SC #1-SC #3 and SC #5-SC #8 is a 484+242-tone MRU. When the MU-RTS triggers transmission of the CTS frames of the multiple stations, the station may transmit the CTS frame through the seven subchannels SC #1-SC #3 and SC #5-SC #8.

The above-described embodiment is described through the MU-RTS frame, but may be applied the same to the RTS frame.

<TXOP Sharing Using MU-RTS Trigger Frame>

The format of a PPDU transmitted as a response to a trigger frame is determined according to the type of a trigger frame in IEEE 802.11ax (Wi-Fi 6). For example, a station having received an MU-RTS trigger frame transmits a CTS frame as a response to the MU-RTS trigger frame. For convenience of description, the MU-RTS trigger frame is an MU-RTS frame for short. A station having received a basic trigger frame transmits a HE TB PPDU as a response to the basic trigger frame. In this case, the station transmits an HE TB PPDU based on a transmission parameter indicated in a user info field of the trigger frame. As such, when an AP indicates a transmission parameter to be applied when a non-AP station transmits a response to the trigger frame. The transmission parameter determined by the AP may not be an optimal transmission parameter. Specifically, for a subchannel determined to be idle by the AP, the station may determine that the corresponding subchannel is not idle. Accordingly, an embodiment in which the station can determine a transmission parameter to be used when the station transmits a response to the trigger frame is required.

To this end, the AP may allow the station to use some intervals of a TXOP acquired by the AP. In this case, the station may generate a PPDU without a trigger by the AP in an allocated interval, and transmit the generated PPDU. For convenience of description, allowing the station to use some intervals of the TXOP acquired by the AP is called TXOP sharing, and an interval in which a TXOP is shared is called a TXOP sharing interval. The AP may indicate TXOP sharing to the station by using an MU-RTS frame. Specifically, the AP corresponding to a TXOP holder may transmit the MU-RTS frame for sharing a TXOP to the non-AP STA. In this case, the non-AP station having received the MU-RTS frame may transmit a PPDU other than a TB PPDU in the TXOP sharing interval. For convenience of description, the MU-RTS frame indicating the TXOP sharing is called an MU-RTS TXS trigger frame. For convenience of description, the MU-RTX TXS trigger frame is called an MU-RTS TXS frame for short.

The MU-RTS TXS frame may include one or more user info fields. In this case, an AID12 subfield of a user info field of the MU-RTS TXS frame indicates a non-AP station to which the TXOP is shared. When the AID12 subfield of the user info field of the MU-RTS TXS frame indicates a station, the station having received the MU-RTS TXS frame may determine that a shared TXOP is allocated to the station. The station having received the MU-RTS TXS frame may transmit a CTS frame as a response to the MU-RTS TXS frame. In this case, an interval between the MU-RTX TXS frame and the CTS frame may be an SIFS. In addition, a UL length of a common info field of the MU-RTS TXS frame may indicate a duration of the shared TXOP. In another specific embodiment, a user info field of the MU-RTX TXS frame may indicate a duration of a shared TXOP to a station corresponding to the user info field.

Specifically, 12 bits of the UL length subfield of the common info field of the MU-RTS TXS frame may indicate a duration of the shared TXOP. In this case, the UL length subfield may indicate a duration the shared TXOP in units of 4 us. In another specific embodiment, some bits of the UL length subfield of the common info field of the MU-RTX TXS frame may indicate the duration of the shared TXOP. For example, seven bits among 12 bits of the UL length subfield of the common info field of the MU-RTS TXS frame may indicate the duration of the shared TXOP. In this case, the UL length subfield may indicate a duration of the shared TXOP in units of 128 us. For example, eight bits among 12 bits of the UL length subfield of the common info field of the MU-RTS TXS frame may indicate a duration of the shared TXOP. In this case, the UL length subfield may indicate a duration of the shared TXOP in units of 64 us. In the above-described embodiments, a maximum duration which can be indicated by the UL length subfield may be 2^14 us. The UL length subfield may indicate a duration corresponding to a value obtained by multiplying (a value of the UL length subfield+1) and a time unit indicated by the UL length subfield. For example, in the above-described embodiment, when the UL length subfield indicates a duration in units of 4 us and a value of the UL length subfield is 10, the duration of the shared TXOP may be 44 us. The station may determine that the TXOP is shared by the duration indicated by the UL length subfield from a time point of receiving the MU-RTS TXS frame. In this case, the station may determine that the MU-RTS TXS frame is received at a time point at which the PHY-RXEND.indication primitive is generated due to a PPDU including the MU-RTS TXS frame. The non-AP station having received the shared TXOP may need to perform transmission so that a PPDU transmitted by the station and a PPDU corresponding to a response to the PPDU transmitted by the station end within the shared TXOP.

The non-AP station may transmit a UL PPDU or a peer to peer (P2P) PPDU within the shared TXOP. The P2P PPDU is a PPDU exchanged between non-AP STAs. Accordingly, both a station for transmitting the P2P PPDU and a station for receiving the P2P PPDU are non-AP stations. In this case, the station for receiving the P2P PPDU may be a station unassociated with an AP associated with the non-AP station. Accordingly, the non-AP station may transmit a PPDU to a non-AP station unassociated with the AP associated with the non-AP station.

The non-AP station having received allocation of the shared TXOP within the shared TXOP may transmit a PPDU while ignoring a NAV configured by a frame transmitted by the AP having allocated the shared TXOP to the non-AP station.

<TXOP Sharing Mode>

An MU-RTS TXS frame may indicate whether transmission of a P2P PPDU is allowed within a shared TXOP. A non-AP station having received the shared TXOP may determine whether the P2P PPDU is transmitted within the shared TXOP based on whether the MU-RTS TXS frame indicates that transmission of the P2P PPDU is allowed within the shared TXOP. When the MU-RTX TXS frame indicates that the transmission of the P2P PPDU is allowed within the shared TXOP, the non-AP station having received allocation of the shared TXOP may transmit the P2P PPDU within the shared TXOP. When the MU-RTS TXS frame does not indicate that the transmission of the P2P PPDU is allowed within the shared TXOP, the non-AP station having received allocation of the shared TXOP cannot transmit the P2P PPDU within the shared TXOP. This is because the transmission of the P2P PPDU needs to be restricted since the transmission of the P2P PPDU may lower the traffic processing efficiency of the entire BSS.

Specifically, the MU-RTX TXS frame may indicate the mode of the shared TXOP. The mode of the shared TXOP may indicate the type of PPDU that the non-AP station having received allocation of the shared TXOP can transmit during the shared TXOP. In this case, the mode of the shared TXOP may include a mode in which transmission of both a P2P PPDU and a UL PPDU is allowed and a mode in which transmission of the UL PPDU is allowed and transmission of the P2P PPDU is disallowed.

The specific subfield of the MU-RTS TXS frame may indicate the mode of the shared TXOP. In this case, the corresponding field may be referred to as a TXOP sharing mode subfield.

FIG. 15 illustrates a format of an MU-RTS TXS frame according to an embodiment of the present disclosure.

In an embodiment of FIG. 15, a common info field of an MU-RTS TXS frame includes a TXOP sharing mode subfield. A reserved field of the MU-RTS TXS frame may be used as the TXOP sharing mode subfield. Specifically, the 20th bit and the 21st bit of the common info field may be used as the TXOP sharing mode subfield. This is because the 20th bit and the 21st bit of the common info field are bits corresponding to a GI and HE/EHT-LTF type field in a basic trigger frame, and the GI and HE/EHT-LTF type field may be configured as a reserved bit in the MU-RTS TXS frame.

The TXOP sharing mode subfield may indicate two modes. The first mode may indicate that a frame including the TXOP sharing mode subfield is the MU-RTS TXS frame and transmission of a P2P PPDU is disallowed within a shared TXOP. In this case, a value of the TXOP sharing mode subfield may be 1. In addition, the second mode may indicate that a frame included in the TXOP sharing mode subfield is the MU-RTS TXS frame and transmission of the UL PPDU and transmission of the P2P PPDU are allowed within the shared TXOP. In this case, a value of the TXOP sharing mode subfield may be 2.

A non-AP station having received allocation of a shared TXOP within the shared TXOP may perform non-HT protection with a non-AP station corresponding to a receiver of a P2P PPDU before transmitting the P2P PPDU. That is, separate transmission projection other than the shared TXOP may be performed. Specifically, the non-AP station having received allocation of the shared TXOP may perform an exchange of an RTS frame and a CTS frame with a non-AP station corresponding to an intended receiver of a P2P PPDU before transmitting the P2P PPDU. In this case, the non-AP station having received allocation of the shared TXOP may transmit an RTS frame within a subchannel through which a CTS frame is transmitted as a response to the MU-RTS TXS. In the disclosure, the wording "being within a channel" indicates being included in a frequency band corresponding to the channel, and indicates being in a frequency band having a bandwidth equal to or smaller than that of the frequency band corresponding to the channel. In addition, the wording "within a frequency band" indicates being included in a bandwidth, and indicates having a frequency bandwidth equal to or smaller than that of the frequency band. In addition, a non-HT PPDU exchange may be performed instead of the exchange of the RTS frame and the CTS frame.

In an embodiment of the present disclosure, when a non-AP station corresponding to an intended receiver of a P2P PPDU receives an RTS frame from a station other than a TXOP holder, the non-AP station may transmit a CTS frame as a response to the RTS frame. In another specific embodiment, when a non-AP station to be an intended receiver of a P2P PPDU receives an RTS frame from a station having received allocation of a shared TXOP from a TXOP holder, the non-AP station to be an intended receiver of the P2P PPDU may transmit a CTS frame as a response to the RTS frame. In this case, when the station having received allocation of the shared TXOP is a transmitter of a CTS frame corresponding to a response to an MU-RTS TXS frame, the non-AP station to be an intended receiver of the P2P PPDU may determine that the station having received allocation of the shared TXOP from the TXOP holder has transmitted the CTS frame. The non-AP station to be an intended receiver of the P2P PPDU may determine, based on whether the intended receiver of the CTS frame is an AP, that the CTS frame received by the non-AP station is a CTS frame corresponding to a response to the MU-RTS TXS frame. In addition, the non-AP station to be an intended receiver of the P2P PPDU may determine, based on whether an interval between the previously transmitted CTS frame and the RTS Frame transmitted later is an SIFS, that the CTS frame received by the non-AP station is a CTS frame corresponding to a response to the MU-RTS TXS frame. In addition, the non-AP station to be an intended receiver of the P2P PPDU may determine, based on whether the intended receiver of the MU-RTS frame transmitted by the AP corresponding to the TXOP holder is identical to the transmitter of the received RTS frame, that the CTS frame received by the non-AP station is a CTS frame corresponding to a response to the MU-RTS TXS frame. When the intended receiver of the MU-RTS frame transmitted by the AP corresponding to the TXOP holder is identical to the transmitter of the received RTS frame, the non-AP station to be an intended receiver of the P2P PPDU may determine that the CTS frame received by the non-AP station is a CTS frame corresponding to a response to the MU-RTS TXS frame.

In the above-described embodiments, the MU-RTS frame is described as an example, but the above-described embodiments may be applied the same to the RTS frame.

In such embodiments, as described above, the intended receiver of the P2P PPDU may transmit the CTS frame while ignoring the NAV configured by the TXOP holder. However, the NAV is configured by a frame transmitted to the intended receiver of the P2P PPDU by a station other than the TXOP holder, the intended receiver of the P2P PPDU cannot ignore the NAV. Accordingly, in this case, the intended receiver of the P2P PPDU cannot transmit the CTS frame.

The intended receiver of the P2P PPDU may determine a subchannel through which the CTS frame is to be transmitted according to the embodiments described through FIG. 14.

In addition, a bandwidth identical or narrower than a bandwidth of a frequency band in which the CTS frame transmitted by the intended receiver of the P2P PPDU is transmitted may be configured with a value of CH_BANDWIDTH or CH_BANDWIDTH_IN_NON_HT of TXVECTOR of the P2P PPDU. The size of the frequency band in which the CTS frame is transmitted may correspond to a frequency band in which a non-HT PPDU or a non-HT duplicate PPDU including the CTS frame is transmitted. In addition, the station having received allocation of the shared TXOP may configure INACTIVE_SUBCHANNELS of TXVECTOR of the P2P PPDU based on a subchannel occupied by the CTS frame transmitted by the intended receiver of the P2P PPDU. Specifically, the station having received allocation of the shared TXOP may configure a subchannel unoccupied by the CTS frame transmitted by the intended receiver of the P2P PPDU as INACTIVE_SUBCHANNELS of TXVECTOR of the P2P PPDU. In a specific embodiment, the station having received allocation of the shared TXOP may configure, with 1, a bit corresponding to the subchannel unoccupied by the CTS frame transmitted by the intended receiver of the P2P PPDU among the bits of INACTIVE_SUBCHANNELS of TXVECTOR of the P2P PPDU.

Figure 16:
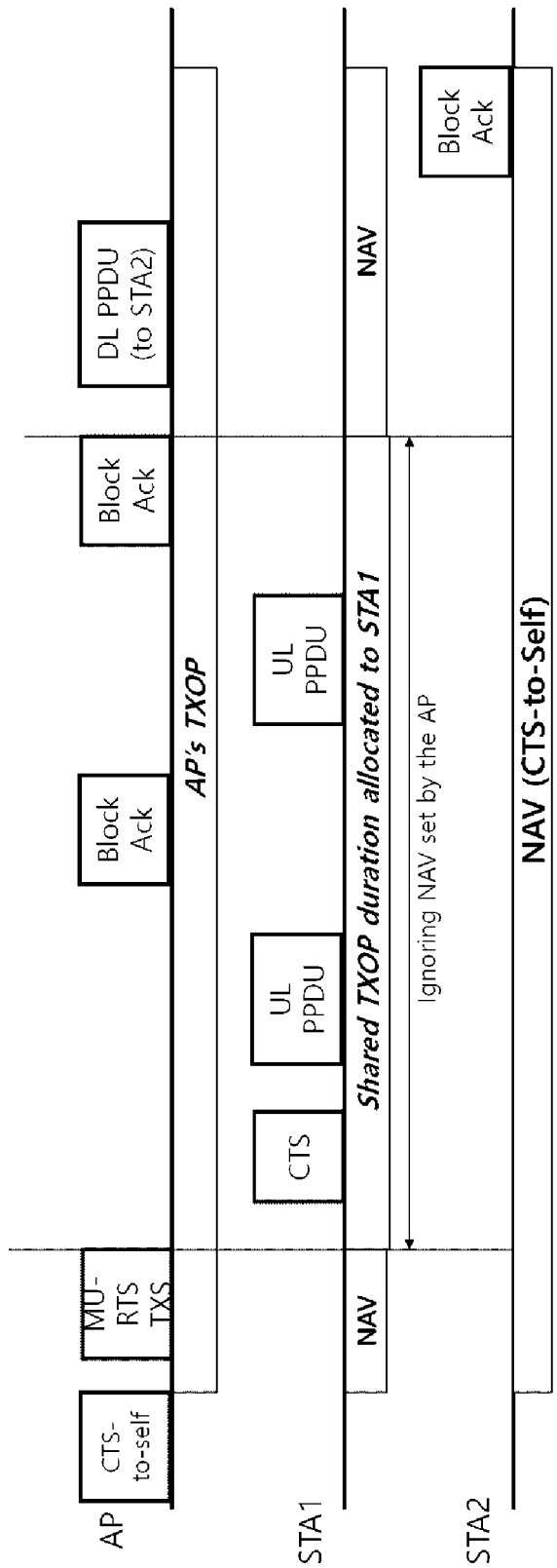
FIG. 16 illustrates that an AP allocates a shared TXOP to a non-AP station by transmitting an MU-RTS TXS frame according to an embodiment of the present disclosure.
Figure 17:
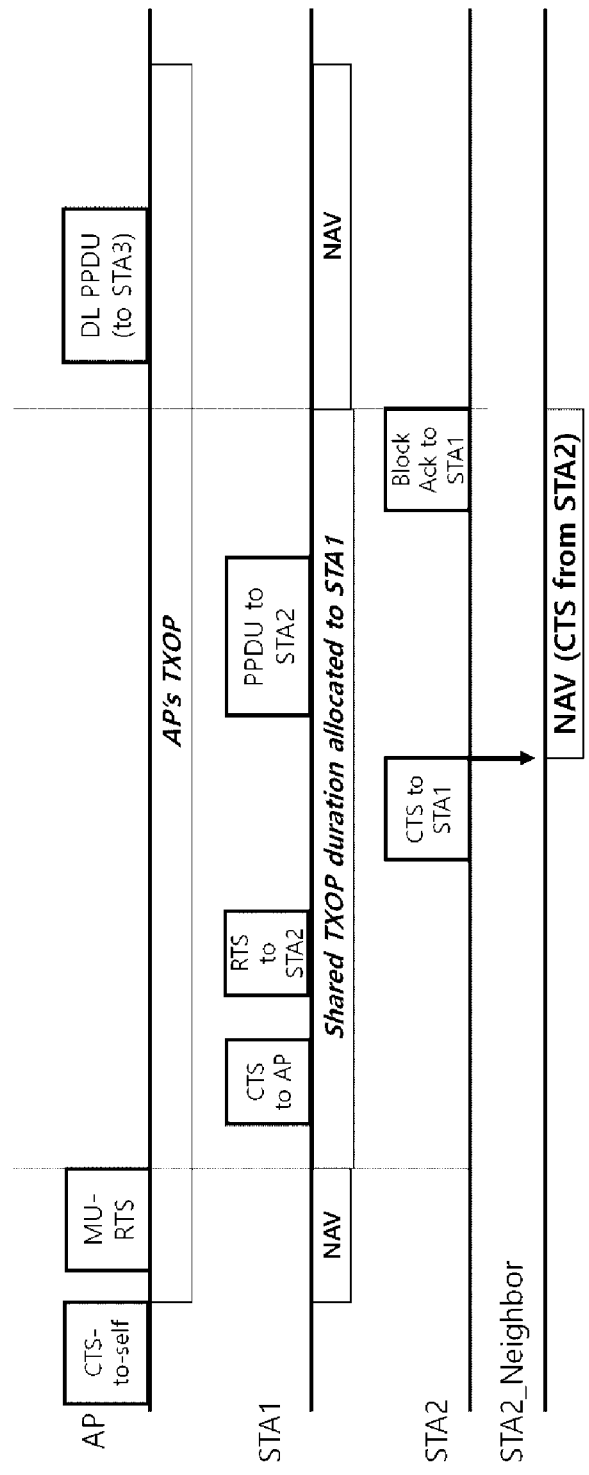
FIG. 17 illustrates that an AP allocates a shared TXOP to a non-AP station by transmitting an MU-RTS TXS frame according to an embodiment of the present disclosure.

FIGS. 16 and 17 illustrate a case where an AP allocates a shared TXOP to a non-AP station by transmitting an MU-RTS TXS frame according to an embodiment of the present disclosure.

In FIG. 16, an AP acquires a TXOP by transmitting a CTS-to-self frame. Thereafter, the AP allocates a shared TXOP to a first station STAT by transmitting an MU-RTS RXS frame. In this case, an AID12 field of a user info field of the MU-RTS TXS frame indicates a first station STA1. In addition, a value of a TXOP sharing mode field of the MU-RTS TXS frame indicates that transmission of a P2P PPDU is disallowed within the shared TXOP.

The first station STA1 determines a duration of the shared TXOP based on a UL length subfield of the MU-RTS TXS frame. The first station STA1 prepares to transmit a UL PPDU according to the value of the TXOP sharing mode field of the MU-RTS TXS frame.

The first station STA1 transmits a CTS frame as a response to the MU-RTS TXS frame. In this case, an interval between the MU-RTS TXS frame and the CTS frame is an SIFS. That is, the first station STA1 transmits the CTS frame after the lapse of an SIFS from a time point at which a PHY-RXEND.indication primitive is generated by a PPDU including the MU-RTS TXS frame. The first station STA1 transmits the CTS frame and transmits the UL PPDU. In this case, an interval between the CTS frame and the UL PPDU is an SIFS.

The first station STA1 transmits the UL PPDU within a subchannel in which the CTS frame is transmitted. In this case, the first station STA1 may transmit the UL PPDU only within the subchannel included in an RU/MRU in which the first station STA1 can perform transmission. In addition, the first station STA1 may transmit the UL PPDU while ignoring the NAV configured by a frame transmitted by the AP as described above. In this case, the first station STA1 may perform physical carrier sensing in a subchannel in which the first station STA1 can transmit the UL PPDU, and transmit the UL PPDU while ignoring the NAV configured by the frame transmitted by the AP if the corresponding subchannel is idle.

The first station STA1 may transmit multiple PPDUs within the shared TXOP. Specifically, when a PPDU transmitted by the first station STA1 and a response to the PPDU end within the shared TXOP, the first station STA1 may transmit multiple PPDUs within the shared TXOP.

When the shared TXOP ends, the AP corresponding to a TXOP holder may initiate transmission of the PPDU within the remaining TXOP.

In FIG. 17, an AP acquires a TXOP by transmitting a CTS-to-self frame. Thereafter, the AP allocates a shared TXOP to a first station STA1 by transmitting an MU-RTX TXS frame. In this case, an AID12 field of a user info field of the MU-RTS TXS frame indicates a first station STA1. In addition, a value of a TXOP sharing mode field of the MU-RTS TXS frame indicates that transmission of a UL PPDU and a P2P PPDU is allowed within the shared TXOP, The first station STA1 determines a duration of the shared TXOP based on a value of the UL length subfield of the MU-RTX TXS frame. The first station STA1 prepares to transmit a P2P PPDU to a second station STA2 according to the value of the TXOP sharing mode field of the MU-RTS TXS frame.

The first station STA1 transmits a CTS frame to the AP, and the first station STA1 transmits an RTS frame to protect transmission of a P2P PPDU to the second station STA2. The second station STA2 transmits a CTS frame as a response to the RTS frame transmitted by the first station STA1.

The first station STA1 may transmit multiple PPDUs within the shared TXOP. Specifically, when a PPDU transmitted by the first station STA1 and a response to the PPDU end within the shared TXOP, the first station STA1 may transmit multiple PPDUs within the shared TXOP.

When the shared TXOP ends, the AP corresponding to a TXOP holder may initiate transmission of the PPDU.

<RU Allocation Subfield of MU-RTS TXS Frame>

As described above, an RU allocation subfield of a trigger frame indicates an RU in which a response to the trigger frame is transmitted. In addition, the RU allocation subfield of the MU-RTS frame may indicate a channel through which a CTS frame is to be transmitted as a response to the MU-RTS. The RU allocation subfield of the MU-RTS TXS frame may indicate an RU in which TXOP sharing is performed. A station having received allocation of a shared TXOP may transmit a UL PPDU or a P2P PPDU through an RU indicated to the station having received allocation of the shared TXOP by the RU allocation subfield of the MU-RTS frame.

The RU allocation subfield of the MU-RTS frame indicates a channel through which a CTS frame is to be transmitted as a response to the MU-RTS, and thus a value that the RU allocation subfield of the MU-RTS frame can have may be configured to be one value among 61 to 68. In addition, the station having received the MU-RTS frame may determine, based on only a value of the RU allocation subfield of the MU-RTS frame, the position of a primary 20 MHz channel through which the CTS frame is to be transmitted.

A method of determining an RU indicated by the RU allocation subfield of the MU-RTS TXS frame may be different from a method of determining an RU indicated by the RU allocation subfield of the MU-RTS frame. Specifically, a station having received the MU-RTS TXS frame may determine an RU indicated by the RU allocation subfield of the MU-RTS TXS frame in a method of determining an RU indicated by the RU allocation field of a trigger frame except for the MU-RTS.

In addition, when the RU allocation subfield of the MU-RTS TXS frame indicates an RU in which TXOP sharing is performed, the RU allocation subfield of the MU-RTS TXS frame may have not only values of 61 to 68 but also a value smaller than 61. In this case, the station having received allocation of the shared TXOP may determine, based on a UL BW subfield of a common field and an RU allocation subfield of a user info field of the MU-RTS TXS frame, an RU in which the TXOP sharing is performed.

In addition, the station having received the MU-RTS TXS frame may transmit a CTS frame through a primary 20 MHz channel even though the RU allocated to the station by the MU-RTS TXS frame does not include the primary 20 MHz channel. The station having received the MU-RTS TXS frame may transmit the CTS frame through the RU allocated to the station by the MU-RTS TXS frame and the primary 20 MHz channel.

In addition, the station having received the MU-RTS TXS frame may determine the RU allocated to the station based on the RU allocation subfield and a PS160 subfield.

The number bits of the RU allocation subfield of the MU-RTS TXS frame may be greater than the number of bits of the RU allocation field of the MU-RTS frame. For example, the number of bits of the RU allocation subfield of the MU-RTS frame may be 8 bits, and the number of bits of the RU allocation subfield of the MU-RTS TXS frame may be 9 bits.

<Configuration of BX (TXVECTOR) of PPDU Transmitted within Shared TXOP>

A method for configuring a frequency band-related parameter of a PPDU transmitted within a shared TXOP is described. Specifically, a bandwidth of a frequency band in which a PPDU is transmitted and whether preamble puncturing is applied to PPDU transmission are described. In the preamble puncturing, a frequency band-related TXVECTOR parameter of a PPDU transmitted during a shared TXOP of the PPDU may be configured according to a pre-designated rule. In this case, the frequency band-related TXVECTOR parameter may include at least one of CH_BANDWIDTH, CH_BANDWIDTH_IN_NON_HT, and INACTIVE_SUBCHANNES. The preamble puncturing may indicate performing PPDU transmission without occupying some RUs among RUs included in a frequency band (BW of TXVECOTR) of the PPDU or some subchannels among subchannels included in the frequency band. The name of TXVECTOR used in the description later is for convenience of description, and the embodiment of the present disclosure can be applied the same to another parameter name indicating the same information.

<CH_BANDWIDTH>

A station having received allocation of a shared TXOP may configure CH_BANDWIDTH of TXVECTOR of a PPDU transmitted within the shared TXOP to be equal to or smaller than CH_BANDWIDTH of TXVECTOR of a PPDU including a CTS frame transmitted as a response to an MU-RTS TXS frame. In this case, when the station transmits a non-HT PPDU, CH_BANDWIDTH_IN_NON_HT rather than CH_BANDWIDTH may be applied. Such embodiments can be applied when the MU-RTS TXS frame allocates the shared TXOP to one station only.

In another specific embodiment, a station having received allocation of a shared TXOP may configure CH_BANDWIDTH of TXVECTOR of a PPDU transmitted within the shared TXOP may be configured to be equal to or smaller than an RU allocated to the station by an MU-RTS TXS frame. In this case, when the station transmits a non-HT PPDU, CH_BANDWIDTH_IN_NON_HT rather than CH_BANDWIDTH may be applied.

According to such an embodiment, when the MU-RTS TXS frame allocates a 484+242-tone RU within primary 80 MHz to the station, the station needs to configure CH_BANDWIDTH or CH_BANDWIDTH_IN_NON_HT of TXVECTOR of the PPDU transmitted within the shared TXOP to be a bandwidth to be identical to or narrower than 80 MHz. In this case, even though the station has transmitted a CTS in a 160 MHz frequency band as a response to the MU-RTS TXS frame, the station needs to configure CH_BANDWIDTH or CH_BANDWIDTH_IN_NON_HT of TXVECTOR of the PPDU transmitted after transmission of the CTS frame to be a bandwidth identical to or narrower than 80 MHz. In addition, even though the MU-RTS TXS frame is transmitted through a 160 MHz PPD, if the MU-RTS TXS frame has allocated a 484+242-tone RU within primary 80 MHz to the station, the station may configure CH_BANDWIDTH or CH_BANDWIDTH_IN_NON_HT of TXVECTOR of the PPDU transmitted within the shared TXOP to be a bandwidth identical to or narrower than 80 MHz.

The station having received allocation of the shared TXOP may configure CH_BANDWIDTH of TXVECOTR of a P2P PPDU based on whether the station having received allocation of the shared TXOP has exchanged a non-HT PPDU with a station for receiving the P2P PPDU within the shared TXOP. The exchange of the non-HT PPDU may be for protecting transmission of the P2P PPDU. Specifically, the exchange of the non-HT PPDU may include an RTS frame and a CTS frame. In addition, the exchange of the non-HT PPDU may include a data frame and an ACK frame. When the station having received allocation of the shared TXOP exchanges the non-HT PPDU with the station for receiving the P2P PPDU within the shared TXOP, the station may configure, with a bandwidth identical to or narrower than CH_BANDWIDTH of RXVECTOR of the non-HT PPDU received from the station for receiving the P2P PPDU, CH_BANDWIDTH or CH_BANDWIDTH_IN_ NON_HT of TXVECTOR of the P2P PPDU.

When the station having received allocation of the shared TXOP has not exchanged the non-HT PPDU with the station for receiving the P2P PPDU within the shared TXOP, the station having received allocation of the shared TXOP may configure, with a bandwidth identical to or narrower than a value of CH_BANDWIDTH_IN_NON_HT of TXVECTOR of the PPDU including the CTS frame transmitted as a response to the MU-RTS TXS frame, CH_BANDWIDTH or CH_BANDWIDTH_IN_NON_HT of TXVECTOR of the P2P PPDU.

In another specific embodiment, when the station having received allocation of the shared TXOP has not exchanged the non-HT PPDU with the station for receiving the P2P PPDU within the shared TXOP, the station having received allocation of the shared TXOP may configure, with a bandwidth identical to or narrower than a value of CH_BANDWIDTH of TXVECTOR of the PPDU previously transmitted by the station within the shared TXOP, CH_BANDWIDTH or CH_BANDWIDTH_IN_NON_HT of TXVECTOR of the P2P PPDU.

The station having received allocation of the shared TXOP may configure, with a bandwidth identical to or narrower than a value of CH_BANDWIDTH_IN_NON_HT of TXVECTOR of the PPDU including the CTS frame transmitted as a response to the MU-RTS TXS frame, CH_BANDWIDTH or CH_BANDWIDTH_IN_NON_HT of TXVECTOR of a UL PPDU.

The station having allocation of the shared TXOP may exchange the RTS frame and the CTS frame with the AP within the shared TXOP. Specifically, the station having allocation of the shared TXOP may transmit the RTS frame to the AP and receive the CTS frame from the AP. In this case, the station may configure, with a bandwidth identical or narrower than CH_BANDWIDTH_IN_NON_HT of RXVECTOR of the PPDU including the CTS frame, CH_BANDWIDTH or CH_BANDWIDTH_IN_NON_HT of TXVECTOR of a UL PPDU transmitted after the CTS frame.

<INACTIVE_SUBCHANNELS>

A station having allocation of a shared TXOP may configure INACTIVE_SUBCHANNELS of TXVECTOR of a PPDU transmitted within the shared TXOP based on a subchannel in which a PPDU including a CTS frame transmitted as a response to an MU-RTX TXS frame is transmitted. The station having received allocation of the shared TXOP may configure, with 1, a value of a bit corresponding to a subchannel in which the PPDU including the CTS frame transmitted as a response to the MU-RTS TXS frame is not transmitted among bits of INACTIVE_SUBCHANNELS of TXVECTOR of the PPDU.

The station having received allocation of the shared TXOP may configure INACTIVE_SUBCHANNELS of TXVECTOR of the PPDU transmitted within the shared TXOP based on an RU allocated to the corresponding station by the MU-RTS TXS frame. The station having allocation of the shared TXOP may configure, with 1, a value of a bit corresponding to a subchannel including the RU allocated to the station by the MU-RTS TXS frame among bits of INACTIVE_SUBCHANNELS of TXVECTOR of the PPDU.

The station having received allocation of the shared TXOP may configure INACTIVE_SUBCHANNELS of TXVECTOR of a P2P PPDU based on whether the station having allocation of the shared TXOP has exchanged a non-HT PPDU with a station for receiving a P2P PPDU within the shared TXOP. The exchange of the non-HT PPDU may be for protecting transmission of the P2P PPDU. Specifically, the exchange of the non-HT PPDU may include an RTS frame and a CTS frame. In addition, the exchange of the non-HT PPDU may include a data frame and an ACK frame. When the station having allocation of the shared TXOP has exchanged the non-HT PPDU with the station for receiving the P2P PPDU within the shared TXOP, the station may configure INACTIVE_SUBCHANNELS of TXVECTOR of the P2P PPDU based on a subchannel unoccupied by the non-HT PPDU received from the station for receiving the P2P PPDU. Specifically, the station having received allocation of the shared TXOP may configure, with 1, a value of a bit corresponding to a subchannel unoccupied by the non-HT PPDU received from the station for transmitting the P2P PPDU among bits of INACTIVE_SUBCHANNELS of TXVECTOR of the P2P PPDU.

In another specific embodiment, when the station having received allocation of the shared TXOP has not exchanged the non-HT PPDU with the station for transmitting the P2P PPDU within the shared TXOP, the station having received allocation of the shared TXOP may configure INACTIVE_SUBCHANNELS of TXVECTOR of the P2P PPDU based on a subchannel unoccupied by the PPDU received by the station within the shared TXOP. Specifically, the station having received allocation of the shared TXOP may configure, with 1, a value of a bit corresponding to a subchannel unoccupied by the PPDU received by the station within the shared TXOP among bits of INACTIVE_SUBCHANNELS of TXVECTOR of the P2P PPDU. In such embodiments, the previously transmitted PPDU may be a PPDU transmitted by the station for receiving the P2P PPDU.

In addition, the above-described embodiments relating to the method for configuring INACTIVE_SUBCHANNELS of TXVECTOR are applicable when the station for receiving the P2P PPDU does not belong to a BSS to which the station having received allocation of the shared TXOP belongs. In addition, the above-described embodiments relating to the method for configuring INACTIVE_SUBCHANNELS of TXVECTOR are applicable regardless of whether the station for receiving the P2P PPDU belongs to a BSS to which the station having received allocation of the shared TXOP belongs.

The station having received allocation of the shared TXOP may configure INACTIVE_SUBCHANNELS of TXVECTOR of the P2P PPDU based on whether the station for receiving the P2P PPDU belongs to a BSS to which the station having received allocation of the shared TXOP belongs. Specifically, when the station for receiving the P2P PPDU belongs to a BSS to which the station having received allocation of the shared TXOP belongs, the station having received allocation of the shared TXOP may configure INACTIVE_SUBCHANNELS of TXVECTOR of the P2P PPDU based on a disabled subchannel that is the most recently indicated by an AP associated with the station having received allocation of the shared TXOP. In this case, the station having received allocation of the shared TXOP may configured, with 1, a value of a bit corresponding to a disabled subchannel that is the most recently indicated by an AP associated with the station having allocation of the shared TXOP among bits of INACTIVE_SUBCHANNELS of TXVECTOR of the P2P PPDU. Through such an embodiment, performing transmission in the disabled subchannel of the AP associated with the station for receiving the P2P PPDU can be prevented. The disabled subchannel may indicate a subchannel determined, by the AP, not to use the BSS operated by the AP. Specifically, the disabled subchannel may be signaled through a disabled subchannel bitmap of an EHT operation element.

When the station for receiving the P2P PPDU does not belong to a BSS to which the station having received allocation of shared TXOP belongs, the station may configure INACTIVE_SUBCHANNELS of TXVECTOR of the P2P PPDU based on the subchannel unoccupied by the PPDU received from the station for receiving the P2P PPDU. Specifically, the station having received allocation of the shared TXOP may configure, with 1, a value of a bit corresponding to a subchannel unoccupied by the PPDU received from the station for receiving the P2P PPDU among bits of INACTIVE_SUBCHANNELS of TXVECTOR of the P2P PPDU. The PPDU having received from the station for receiving the P2P PPDU may be limited to a PPDU including the CTS frame. In addition, the PPDU received from the station for receiving the P2P PPDU may be a PPDU that is the most recently received from the station for receiving the P2P PPDU.

In addition, the station having received allocation of the shared TXOP may transmit a PPDU in the shared TXOP based on a subchannel that is the most recently indicated as a disabled subchannel by an AP associated with the station having received allocation of the shared TXOP. Specifically, the station having received allocation of the shared TXOP may configure, with 1, a value of a bit corresponding to a subchannel that is the most recently indicated as a disabled subchannel by an AP associated with the station having received allocation of the shared TXOP among bits of INACTIVE_SUBCHANNELS of TXVECTOR of the PPDU transmitted in the shared TXOP.

<Method for Configuring TXECTOR of AP after Termination of Shared TXOP>

In general, a station corresponding to a TXOP holder configures a TXVECTOR parameter of a PPDU transmitted based on a previous PPDU transmitted within a TXOP. For example, a station corresponding to a TXOP holder configures a TXVECTOR parameter of a PPDU transmitted based on a bandwidth of a previously transmitted PPDU within a TXOP. When a shared TXOP is configured, an AP may fail to receive a PPDU transmitted within the shared TXOP. Specifically, when the station having received allocation of the shared TXOP transmits a P2P PPDU, there high possibility that the station fails to receive a PPDU from a station corresponding to an intended receiver of the P2P PPDU. Specifically, the station corresponding to the intended receiver of the P2P PPDU may be a node hidden from the AP. Such a situation may need to be considered when the AP corresponding to the TXOP holder performs transmission and configures a TXVECTOR parameter of the PPDU after termination of the shared TXOP. A method for configuring a TXVECTOR parameter of a PPDU when an AP corresponding to a TXOP holder performs transmission after termination of a shared TXOP according to an embodiment of the present disclosure is described.

In an embodiment of the present disclosure, an AP corresponding to a TXOP holder may configure a parameter of TXVECTOR of a PPDU transmitted by the AP after termination of a shared TXOP based on the a PPDU the most recently received by the AP. Specifically, the AP corresponding to the TXOP holder may configure CH_BANDWIDTH of TXVECTOR of the PPDU transmitted by the AP after termination of the shared TXOP based on a bandwidth of the PPDU that is the most recently received by the AP. In this case, the AP corresponding to the TXOP holder may configure, with a bandwidth identical to or narrower than a bandwidth of the PPDU that is the most recently received by the AP, CH_BANDWIDTH of TXVECTOR of the PPDU transmitted by the AP after termination of the shared TXOP. The AP corresponding to the TXOP holder may configure INACTIVE_SUBCHANNELS of TXVECTOR of the PPDU transmitted by the AP after termination of the shared TXOP based on a subchannel occupied by the PPDU that is the most recently received by the AP. In this case, the AP corresponding to the TXOP holder may configure, with 1, a bit corresponding to a subchannel unoccupied by a PPDU that is the most recently received by the AP among bits of INACTIVE_SUBCHANNELS of TXVECTOR of the PPDU transmitted by the AP after termination of the shared TXOP. In an embodiment of the present disclosure, the AP corresponding to the TXOP holder may configure RU_ALLOCATION of TXVECTOR of an MU PPDU transmitted by the AP after termination of the shared TXOP based on a PPDU that is the most recently received by the AP. Specifically, the AP corresponding to the TXOP holder may configure RU_ALLOCATION of TXVECTOR of an MU PPDU transmitted by the AP after termination of the shared TXOP based on a 20 MHz subchannel occupied by the PPDU that is the most recently received by the AP. In this case, the AP corresponding to the TXOP holder may not allow an RU included in the 20 MHz subchannel occupied by the PPDU that is the most recently received by the AP to be configured to be RU_ALLOCATION of TXVECTOR of the MU PPDU transmitted by the AP after termination of the shared TXOP. In this case, the MU PPDU may include at least one of an EHT MU PPDU and a HE MU PPDU.

The above-described embodiments are applicable when the TXOP of the TXOP holder is not protected by a non-HT PPDU or a non-HT duplicate PPDU.

Another embodiment of configuring a parameter of TXVECTOR of a PPDU transmitted by an AP after termination of a shared TXOP is applicable when the AP corresponding to a TXOP holder has exchanged a non-HT PPDU transmitted to protect the TXOP. For convenience of description, a PPDU received as a response to a non-HT PPDU transmitted to protect the TXOP is referred to as a response non-HT PPDU. The AP corresponding to the TXOP holder may configure, based on the response non-HT PPDU, a parameter of TXVECTOR of the PPDU transmitted by the AP after termination of the shared TXOP. Specifically, the AP corresponding to the TXOP holder may configure, based on a bandwidth of a response non-HT PPDU, CH_BANDWIDTH of TXVECTOR of the PPDU transmitted by the AP after termination of the shared TXOP. In this case, the AP corresponding to the TXOP holder may configure, with CH_BANDWIDTH or CH_BANDWIDTH_IN_NON_HT of TXVECTOR of the PPDU transmitted by the AP after termination of the shared TXOP, a bandwidth identical or narrower than a bandwidth of the response non-HT PPDU. The AP corresponding to the TXOP holder may configure, based on a subchannel occupied by the response non-HT PPDU, INACTIVE_SUBCHANNELS of TXVECTOR of the PPDU transmitted by the AP after termination of the shared TXOP. In this case, the AP corresponding to the TXOP holder may configured, with 1, a bit corresponding to a subchannel unoccupied by the response non-HT PPDU among bits of INACTIVE_SUBCHANNELS of TXVECTOR of the PPDU transmitted by the AP after termination of the shared TXOP. In an embodiment of the present disclosure, the AP corresponding to the TXOP holder may configure, based on the response non-HT PPDU, RU_ALLOCATION of TXVECTOR of an MU PPDU transmitted by the AP after termination of the shared TXOP. Specifically, the AP corresponding to the TXOP holder may configure, based on a 20 MHz subchannel occupied by the response non-HT PPDU, RU_ALLOCATION of TXVECTOR of the MU PPDU transmitted by the AP after termination of the shared TXOP. In this case, the AP corresponding to the TXOP holder may allow an RU included in the 20 MHz subchannel occupied by the response non-HT PPDU to be configure as RU_ALLOCATION of TXVECTOR of the MU PPDU transmitted by the AP after termination of the shared TXOP. In this case, the MU PDU may include at least one of an EHT MU PPDU and an HE MU PPDU. Such embodiments are applicable only when the AP performs, after termination of the shared TXOP, transmission for the station having transmitted the response non-HT PPDU before the shared TXOP.

In addition, TXOP protection through non-HT PPDU transmission may include at least one of an exchange of an RTS frame and a CTS frame and an exchange of an MU-RTS frame and a CTS frame. In addition, when TXOP protection using a non-HT PPDU has used CTS-to-self frame transmission, the AP corresponding to the TXOP holder may configure, based on the PPDU that is the most recently received by the AP, a parameter of TXVECTOR of the PPDU transmitted by the AP after termination of the shared TXOP, as described in the embodiments above.

Figure 18:
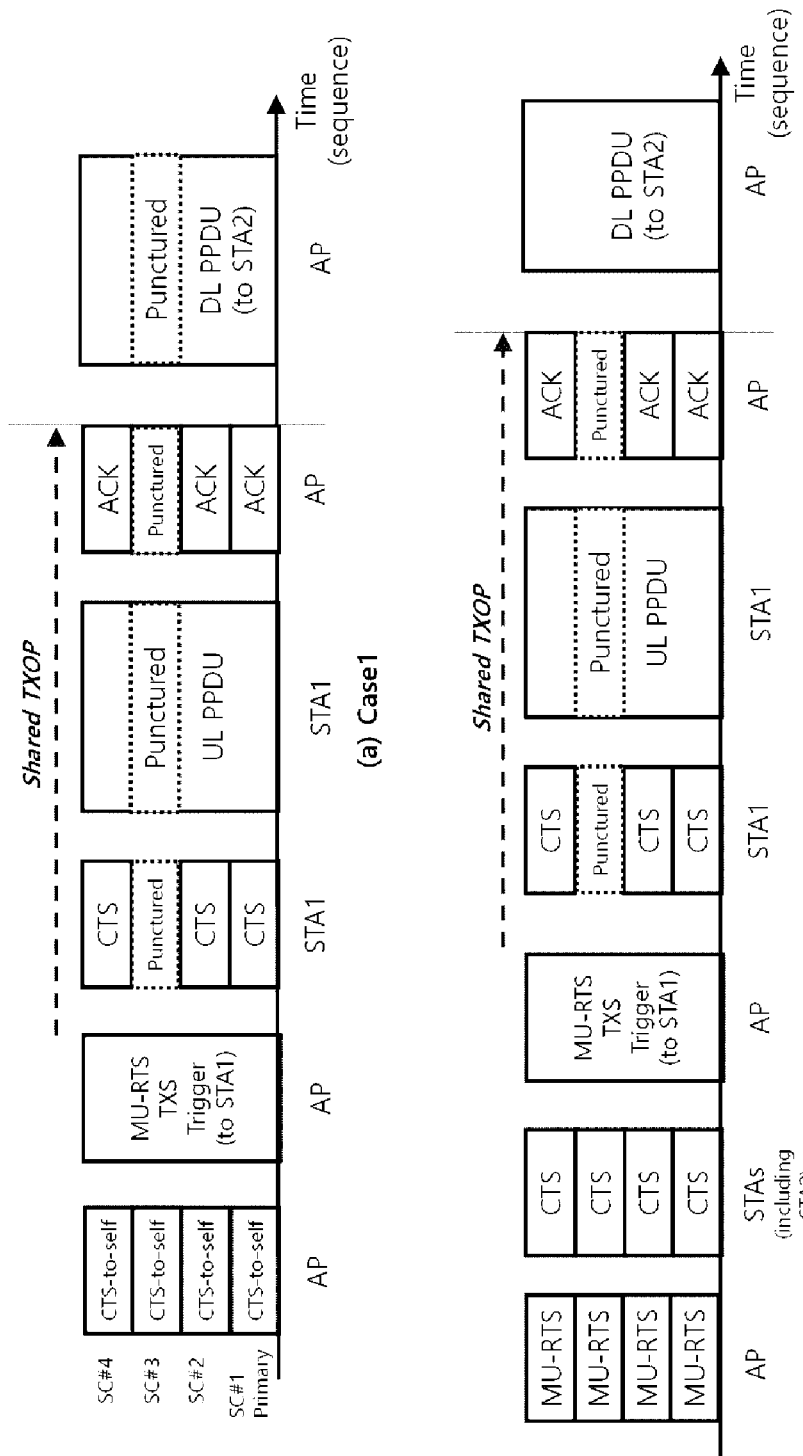
FIG. 18 illustrates a method for configuring, by an AP corresponding to a TXOP holder, a parameter of TXVECTOR of a PPDU transmitted by the AP after a shared TXOP ends according to an embodiment of the present disclosure.
Figure 19:
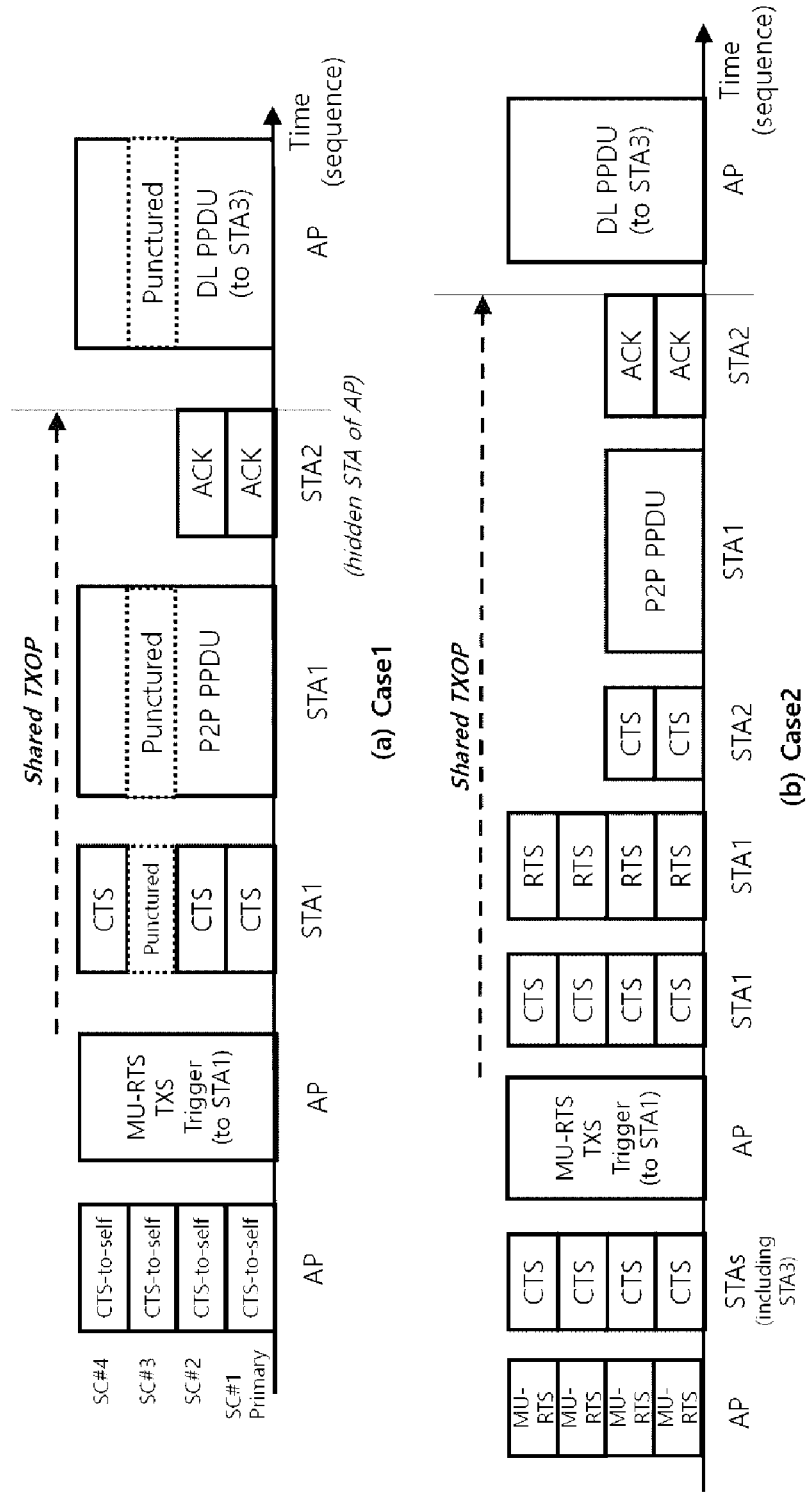
FIG. 19 illustrates a method for configuring, by an AP corresponding to a TXOP holder, a parameter of TXVECTOR of a PPDU transmitted by the AP after a shard TXOP ends according to an embodiment of the present disclosure.

FIGS. 18 and 19 illustrate a method in which an AP corresponding to a TXOP holder configures, after termination of a shared TXOP, a parameter of TXVECTOR of a PPDU transmitted by the AP according to an embodiment of the present disclosure.

In (a) of FIG. 18, an AP acquires a TXOP by transmitted a CTS-to-self frame. The AP allocates a shared TXOP to a first station STA1 by transmitting an MU-RTS TXS frame to the first station STA1. The station STA1 transmits a UL PPDU to the AP within the shared TXOP. After the shared TXOP ends, the AP transmits a PPDU to a second station STA2. In this case, the AP and the second station STA2 have not exchanged a non-HT PPDU within the TXOP. Accordingly, the AP configures, based on the most recently received PPDU, a TXVECTOR parameter of a DL PPDU transmitted to the second station STA2. In this case, the PPDU that is the most recently received by the AP is a PPDU including an ACK frame transmitted by the first station AP. A bandwidth of the PPDU including the ACK frame transmitted by the first station STA1 is 80 MHz, and thus the AP configures, to a value equal to or less than 80 MHz, CH_BANDWIDTH of TXVECTOR of the DL PPDU transmitted to the second station STA2. In addition, a second subchannel SC #3 is punctured in the PPDU including the ACK frame transmitted by the first station AP, and thus the AP configures, with 1, a bit corresponding to a third subchannel among INACTIVE_SUBCHANNELS of TXVECTOR of the DL PPDU transmitted to the second station STA2.

In (b) of FIG. 18, an AP transmits an MU-RTS frame to a first station STA1 and a second station STA2, and receives a CTS frame from the first station STA1 and the second station STA2. Through this, the AP acquires a TXOP. The AP allocates a shared TXOP to the first station STA1 by transmitting an MU-RTS TXS frame to the first station STA1. The first station STA1 transmits a UL PPDU to the AP within the shared TXOP. After the shared TXOP ends, the AP transmits a PPDU to the second station STA2. In this case, the AP and the second station STA2 have exchanged a non-HT PPDU including an RTS frame and a non-HT PPDU including a CTS frame within the TXOP. Accordingly, the AP configures, based on the non-HT PPDU including the CTS frame, a parameter of TXVECTOR of a DL PPDU transmitted to the second station STA2. The bandwidth of the non-HT PPDU including the CTS frame is 80 MHz, and thus the AP configures, with a value equal to or less than 80 MHz, CH_BANDWIDTH of TXVECTOR of the DL PPDU transmitted by the second station STA2. In addition, the non-HT PPDU including the CTS frame does not include a punctured subchannel. Accordingly, the AP configures, with 0, bits corresponding to the first subchannel SC #1 to the fourth subchannel SC #4 of INACTIVE SUBCHANNEL of TXVECTOR of the DL PPDU transmitted to the second station STA2.

In (a) of FIG. 19, an AP acquires a TXOP by transmitting a CTS-to-self frame. The AP allocates a shared TXOP to a first station STA1 by transmitting an MU-RTS TXS frame to the first station STA1. The first station STA1 transmits a P2P PPDU to a second station STA2 within the shared TXOP. After the shared TXOP ends, the AP transmits a DL PPDU to a third station STA3. In this case, the AP and the third station STA3 have not exchanged a non-HT PPDU within the TXOP. Accordingly, the AP configures, based on the most recently received PPDU, a TXVECTOR parameter of the DL PPDU transmitted to the third station STA3. In this case, the PPDU that is the most recently received by the AP is a P2P PPDU transmitted by the first station AP. A bandwidth of the P2P PPDU transmitted by the first station AP is 80 MHz, and thus the AP configures, with a value equal to or less than 80 MHz, CH_BANDWIDTH of TXVECTOR of the DL PPDU transmitted to the third station STA3. In addition, a third subchannel SC #3 is punctured in the P2P PPDU transmitted by the first station STA1, and thus the AP configures, with 1, a bit corresponding to the third subchannel among INACTIVE_SUBCHANNELS of TXVECTOR of the DL PPDU transmitted to the third station STA3.

In (b) of FIG. 19, an AP transmits an MU-RTS frame to a first station STA1 to a third station STA3, and receives a CTS frame from the first station STA1 to the third station STA3. Through this, the AP acquires a TXOP. The AP allocates a shared TXOP to the first station STA1 by transmitting an MU-RTS TXS frame to the first station STA1. The first station STA1 transmits a P2P PPDU to the second station STA3 within the shared TXOP. After the shared TXOP ends, the AP transmits a PPDU to the third station STA3. In this case, the AP and the third station STA3 have exchanged a non-HT PPDU including an RTS frame and a non-HT-PPDU including a CTS frame within the TXOP. Accordingly, the AP configures, based on a non-HT PPDU including the CTS frame, a TXVECTOR parameter of a DL PPDU transmitted to the third station STA3. A bandwidth of the non-HT PPDU including the CTS frame is 80 MHz, and thus the AP configures, with a value equal to or less than 80 MHz, CH_BANDWIDTH of TXVECTOR of the DL PPDU transmitted to the third station STA3. In addition, the non-HT PPDU including the CTS frame does not include a punctured subchannel. Accordingly, the AP configures, with 0, bits corresponding to a first subchannel SC #1 to a fourth subchannel SC #4 of INACTIVE SUBCHANNEL of TXVECTOR of the DL PPDU transmitted to the third station STA3.

In another specific embodiment, restriction may be applied to the last PPDU transmitted within the shared TXOP. Specifically, the last PPDU transmitted within the TXOP may be limited to a PPDU transmitted by a station having allocation of the shared TXOP or a PPDU including a frame, the intended receiver of which is the AP.

In another specific embodiment, a station having received allocation of a shared TXOP may perform signaling of information relating to a bandwidth of the last PPDU transmitted in the shared TXOP, through the last PPDU transmitted by the station within the shared TXOP. In this case, the last PPDU transmitted by the station within the shared TXOP or a MAC frame included in the last PPDU transmitted by the station within the shared TXOP may include information on the bandwidth of the last PPDU transmitted in the shared TXOP. In addition, the information relating to the bandwidth of the last PPDU transmitted in the TXOP may include at least one of information on a subchannel occupied by the last transmitted PPDU and information on a subchannel punctured in the last transmitted PPDU.

<Method for Configuring TXVECTOR of PPDU when Intended Receiver of PPDU Transmitted within Shared PPDU is Changed>

Figure 20:
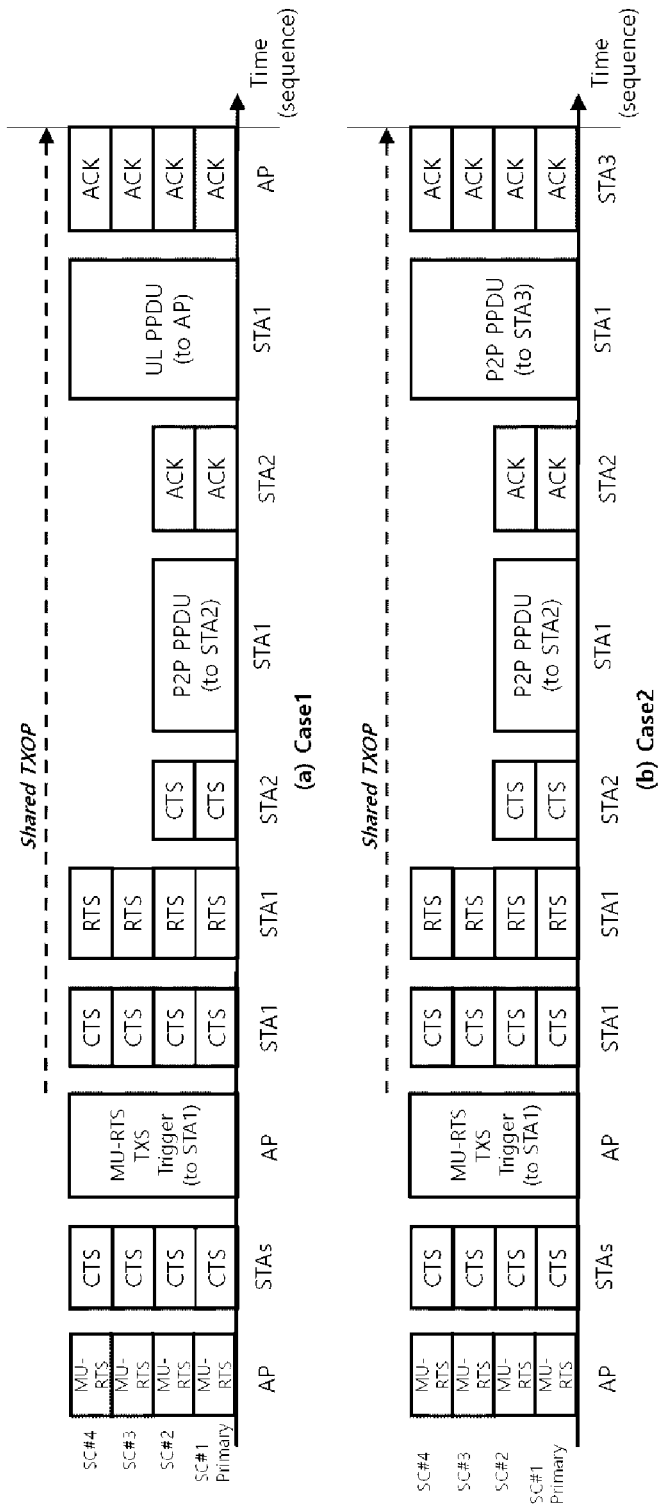
FIG. 20 illustrates a method for configuring TXVECTOR of a PPDU when an intended receiver of a PPDU transmitted within a shared TXOP is changed according to an embodiment of the present disclosure.

FIG. 20 illustrates a method for configuring TXVECTOR of a PPDU when an intended receiver of a PPDU transmitted within a shared TXOP is changed according to an embodiment of the present disclosure.

In (a) of FIG. 20, an AP acquires a TXOP and transmits an MU-RTS TXS frame to a first station STA1. The MU-RTS TXS frame indicates that transmission of not only a UL PPDU but also a P2P PPDU is allowed within a shared TXOP. The first station STA1 transmits a CTS frame as a response to the MU-RTS TXS frame to the AP. In this case, the CTS frame is transmitted through an 80 MHz frequency band. The first station STA1 transmits an RTS frame to the second station STA2 before transmitting the P2P PPDU to the second station STA2. In this case, the RTS frame is transmitted through an 80 MHz frequency band. The second station STA2 transmits a CTS frame to the first station STA1. In this case, the CTS frame is transmitted through a 40 MHz frequency band. Accordingly, the first station STA1 configures, with a value equal to or less than 40 MHz, CH_BANDWIDTH of TXVECTOR of the PPDU transmitted to the second station STA2. The first station STA1 receives an ACK frame from the second station STA2 through the P2P PPDU and transmits the UL PPDU to the AP during the remaining shared TXOP. The bandwidth of the PPDU including the CTS frame transmitted to the AP by the first station STA1 is 80 MHz, and thus the first station STA1 configures CH_BANDWIDTH of TXVECTOR of the UL PPDU with a value equal to or less than 80 MHz.

In (b) of FIG. 20, an AP acquires a TXOP and transmits an MU-RTS TXS frame to a first station STA1. The MU-RTS TXS frame indicates that transmission of not only a UL PPDU and a P2P PPDU is allowed within a shared TXOP. The first station STA1 transmits a CTS frame as a response to the MU-RTS TXS frame to the AP. In this case, the CTS frame is transmitted through an 80 MHz frequency band. The first station STA1 transmits an RTS frame to the second station STA2 before transmitting the P2P PPDU to the second station STA2. In this case, the RTS frame is transmitted through an 80 MHz frequency band. The second station STA2 transmits a CTS frame to the first station STA1. In this case, the CTS frame is transmitted through a 40 MHz frequency band. Accordingly, the first station STA1 configures, with a value equal to or less than 40 MHz, CH_BANDWIDTH or CH_BANDWIDTH_IN_NON_HT of TXVECTOR of the PPDU transmitted to the second station STA2. The first station STA1 receives an ACK frame from the second station STA2 through the P2P PPDU and transmits the P2P PPDU to the third station STA3 during the remaining shared TXOP. The first station STA1 and the third station STA3 have never exchanged the RTS frame and the CTS frame. In addition, the bandwidth of the PPDU including the CTS frame transmitted to the AP is 80 MHz, and thus the first station STA1 configures, with a value equal to or less than 80 MHz, CH_BANDWIDTH or CH_BANDWIDTH_IN_NON_HT of TXVECTOR of the PPDU transmitted to the third station.

<Method for Managing TXOP by AP>

An AP may perform TXOP recovery after termination of a shared TXOP. When the AP receives a CTS frame from a station after transmitting an MU-RTS TXS frame to the station, the AP may determine that shared TXOP allocation for the station has been completed. The AP may be restricted to transmit a PPDU in the shared TXOP. In addition, a station having received allocation of the shared TXOP may not perform transmission. This is because the station having received allocation of the shared TXOP may not have traffic enabling transmission within the shared TXOP. When the station having received allocation of the shared TXOP does not perform transmission within the shared TXOP, the AP may perform TXOP recovery. Specifically, when only UL PPDU transmission is allowed within the shared TXOP and a channel in which TXOP sharing is performed is idle for a PIFS (SIFS+aSlotTime) after the most recent PPDU transmission performed in the shared TXOP, the AP may perform TXOP recovery. In this case, the AP may determine that the shared TXOP has ended. In addition, when only UL PPDU transmission is allowed within the shared TXOP and a channel in which TXOP sharing is performed is idle for a PIFS (SIFS+aSlotTime) after the most recent PPDU transmission performed in the shared TXOP, the AP may initiate transmission of the AP. Through such embodiments, losing the TXOP due to no transmission performed for the PIFS can be prevented.

In addition, after termination of the shared TXOP, the AP may perform TXOP recovery. Specifically, if a channel in which TXOP sharing is performed is not idle when the shared TXOP ends, the AP may perform TXOP recovery. In a specific embodiment, if the TXOP is remaining and a channel in which the TXOP sharing is performed is not idle when the shared TXOP ends, the AP may perform TXOP recovery.

The TXOP recovery performed by the AP may be attempting PPDU transmission once the channel has been idle for the PFIS. In addition, the TXOP recovery performed by the AP may be performing a new backoff operation. In addition, the TXOP recovery performed by the AP may be waiting until a TXNAV timer ends. Such a TXOP recovery operation is different from a recovery operation performed by a TXOP holder due to a failure in the PPDU transmission in that the TXOP recovery operation is performed even where there is no transmission failure. When a backoff operation is performed in the TXOP recovery, the AP may configure a value of CW[AC] used in the backoff operation with a minimum value of CW[AC]. This is because transmission of the MU-RTS TXS frame transmitted for TXOP sharing has been successfully performed. In addition, when the backoff operation is performed in the TXOP recovery, the AP may configure QSRC[AC] used in the backoff operation with 0.

In addition, when the backoff operation is performed in the TXOP recovery, the AP may not allow extension of the TXNAV through the backoff operation. In this case, the AP reduces a value of the TXNAV according to a timer while maintaining the existing TXNAV value. In addition, when the backoff operation is performed in the TXOP recovery, the AP may not allow expansion of the bandwidth of the frequency band in which the TXOP is acquired. In this case, the AP may perform transmission within the bandwidth of the frequency band in which the TXOP is acquired. When the AP acquires the TXOP through non-HT PPDU protection, the bandwidth of the frequency band in which the TXOP is acquired may be a bandwidth of the frequency band in which the non-HD PPDU is performed. When the AP acquires the TXOP not through the non-HT PPDU protection, the bandwidth of the frequency band in which the TXOP is acquired may be a bandwidth of a PPDU that is the most recently received within the TXOP. The TXOP recovery corresponds to waiting until the TXNAV timer ends, such restriction may not be applied. This is because after the TXOP ends, the AP acquired a new TXOP.

<Method for P2P Transmission Protection for Legacy P2P Peer Station>

As described above, a station having received allocation of a shared TXOP may protect P2P PPDU transmission by exchanging an RTS frame and a CTS frame with an intended receiver of a P2P PPDU before transmitting the P2P PPDU. When the intended receiver of the P2P PPDU is a legacy station, the intended receiver of the P2P PPDU may ignore the RTS frame because the RTS frame is transmitted by the station rather than an AP corresponding to a TXOP holder. Accordingly, the intended receiver of the P2P PPDU may not transmit the CTS frame to the AP corresponding to the TXOP holder. Accordingly, a method for protecting P2P PPDU transmission even when the intended receiver of the P2P PPDU is a legacy station is required.

The AP may configure a value of a duration field of an MU-RTS TXS frame as a value until reception of a CTS frame from a station having received allocation of a shared TXOP. In a specific embodiment, the AP may configure a value of a duration field of each of an MU-RTS TXS frame and a frame transmitted before the MU-RTS TXS frame with a value until reception of a CTS frame from a station having received allocation of a shared TXOP. Through this, the legacy station may determine, as a TXOP holder, the station having received allocation of the shared TXOP and transmitting the RTS frame within the shared TXOP. The AP may configure a value of a duration field of the MU-RTS TXS frame with a value obtained by summating a transmission time of the CTS frame corresponding to a response to the MU-RTS TXS frame and 2xSIFS. In another specific embodiment, the AP may configure a value of a duration field of the MU-RTS TXS frame with a value obtained by summating a transmission time of the CTS frame and an SIFS. In a specific embodiment, the value of the duration field may be configured to be a value until reception of the CTS frame from the station having received allocation of the TXOP.

The above-described embodiments and embodiments to be described below are applicable only when P2P PPDU transmission is allowed in a shared TXOP. In addition, the above-described embodiments are applicable only when a TXOP is shared within a restricted target wake time (R-TWT) service period (SP). In this case, the R-TWT SP is a type of a TWT SP, and is a service period in which TID traffic designated to be low-latency traffic by the AP is processed with the highest priority. In this case, the R-TWT SP may be an R-TWT SP in which transmission of at least one MU-RTS TXS frame is scheduled. Specifically, the R-TWT SP may be configured by a TWT element having a broadcast TWT recommendation field configured with 5.

In another specific embodiment, the above-described embodiments and embodiments to be described below are applicable only when a station having received allocation of a shared TXOP has signaled, to the AP, that the station has an intention to protect P2P PPDU transmission by exchanging a RTS frame and a CTS frame.

In another specific embodiment, the above-described embodiments and embodiments to be described below are applicable only when a station having received allocation of a shared TXOP has reported that there is traffic to be transmitted to a P2P peer station. Specifically, the above-described embodiments are applicable only when a station having received allocation of a shared TXOP has reported that there is low-latency traffic to be transmitted to a P2P peer station. In this case, the station having received allocation of the shared TXOP may report, to the AP using a P2P buffer status report (PBSR) control field of an A-control field of a MAC frame, that there is traffic to be transmitted to a P2P peer station. In this case, the station having received allocation of the shared TXOP indicates a control ID of the A-control field through P2P buffer status report control.

In the above-described embodiments, a neighbor station may determine that the TXOP ends before the station having received allocation of the shared TXOP protect P2P PPDU transmission by transmission the non-HT PPDU. Accordingly, the neighbor station may attempt to perform transmission within the shared TXOP before the P2P PPDU transmission starts. This will be described through FIG. 21.

Figure 21:
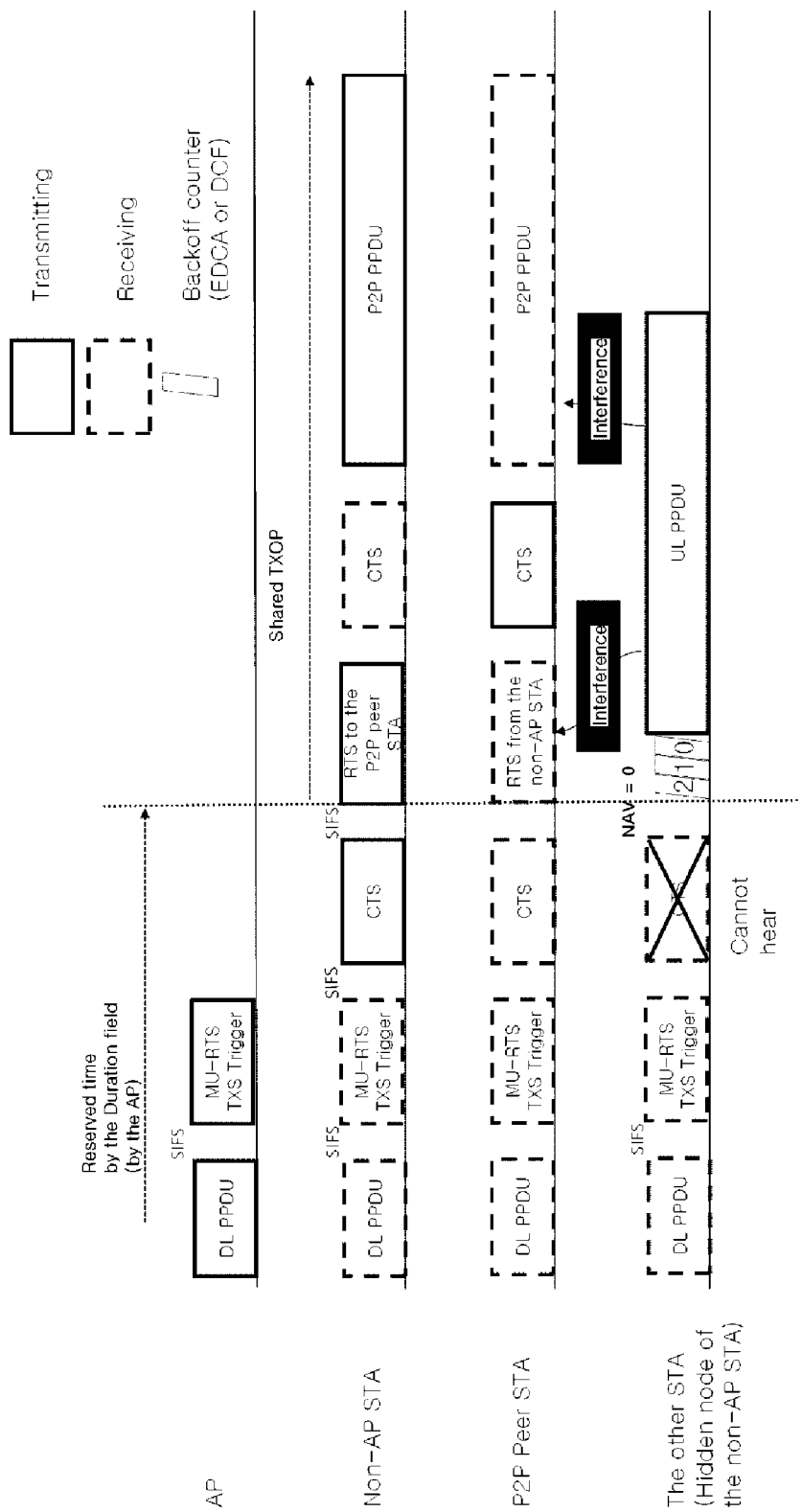
FIG. 21 illustrates that an AP configures a value of a duration field of an MU-RTS TXS frame with a value until a time point of receiving a CTS frame for the MU-RTS TXS frame according to an embodiment of the present disclosure.

FIG. 21 illustrates that an AP configures a value of a duration field of an MU-RTS TXS frame with a value until a time point of receiving a CTS frame for the MU-RTS TXS frame according to an embodiment of the present disclosure.

In FIG. 21, an AP acquires a TXOP and transmits an MU-RTS TXS frame to a first station STA1. The MU-RTS TXS frame indicates that transmission of not only a UL PPDU but also a P2P PPDU is allowed within a shared TXOP. In addition, the AP configures a value of a duration field of the MU-RTS TXS frame with a value until a time point of receiving a CTS frame for the MU-RTS TXS frame. The first station STA1 transmits an RTS frame to a P2P peer station (P2P peer STA). In this case, a neighbor station (other STA) positioned near the AP and corresponding to a node hidden from the first station STA1 determines that the TXOP configured by the AP has expired. Accordingly, while the first station STA1 transmits the RTS frame to the P2P peer station (P2P peer STA), the neighbor station (other STA) may attempt new transmission. Accordingly, P2P PPDU transmission may be interrupted. An embodiment of configuring a value of a duration field of an MU-RTS TXS frame in consideration of the description above is described.

The AP may configure a value of the duration field of the MU-RTS TXS frame based on transmission of a specific frame within a shared TXOP. Specifically, the AP may configure a value of the duration field of the MU-RTS TXS frame as a value until transmission of a specific frame within the shared TXOP. In this case, the specific frame may be a frame included in a UL PPDU first transmitted by the station having received allocation of the shared TXOP after transmitting a response to the MU-RTS TXS frame. For convenience of description, the frame included in the UL PPDU first transmitted by the station having received allocation of the shared TXOP after transmitting the response to the MU-RTS TXS frame is referred to as an initiating frame. In another specific embodiment, the specific frame may be a response to the AP for the initiating frame. The duration field of each of the initiating frame and the response frame may be configured with a value equal to or smaller than a value of an end time of the shared TXOP.

In the above-described embodiments, the AP may configure values of the duration fields of not only the MU-RTS TXS frame but also a frame transmitted before the MU-RTS TXS frame based on transmission of a specific frame within the shared TXOP. When the above-described embodiment relating to the configuration of the value of the duration field is applied, the station having received allocation of the shared TXOP may perform the first frame exchange in the shared TXOP according to a pre-configured frame exchange. The station having received allocation of the shared TXOP may determine whether the above-described embodiments relating to the configuration of the value of the duration field are applied based on the value of the duration field. Specifically, when the value of the duration field is equal to or smaller than a pre-configure value, the station having received allocation of the shared TXOP may determine that the above-described embodiments relating to the configuration of the value of the duration field are applied. The pre-configured value may indicate a value configured according to embodiments relating to the configuration of the duration field.

Specifically, the station having received allocation of the shared TXOP may determine that the above-described embodiments relating to the configuration of the value of the duration field are applied through comparison of the value of the duration field with a value at a shared TXOP end time point. In a specific embodiment, when the value of the duration field is smaller than that of the shared TXOP end time, the station having received allocation of the shared TXOP may determine that the above-described embodiments relating to the configuration of the value of the duration field are applied. In addition, when the value of the duration field is equal to or greater than a value at a shared TXOP end time, the station having received allocation of the shared TXOP may determine that the above-described embodiments relating to the configuration of the value of the duration field are not applied.

The above-described initiating frame may be an RTS frame. In addition, a UL PPDU including the initiating frame may be a PPDU including only the RTS frame. In such embodiments, the RTS frame may be an RTS frame having a receiver address designated as an AP. The value of the duration field of the RTS frame may be configured with that of the shared TXOP end time point. In addition, a case where the value of the duration field of the RTS frame is configured with a value greater than that of the shared TXOP end time point may not be allowed. In addition, a method for transmitting a PPDU including the RTS frame may be designated as follows. The station having received allocation of the shared TXOP may transmit a PPDU including the RTS frame by using a pre-designated format and a pre-designated MCS. In this case, the pre-designated format may be a non-HT PPDU or a non-HT duplicate PPDU. In addition, the pre-designated MCS may be MSC0 or MCS1. For example, a PPDU including the RTS frame may be a non-HT PPDU, the RATE subfield of an L-SIG subfield of which indicates 6 MB/S.

The AP may configure, with the following values, duration fields of the MU-RTS TXS frame and a frame transmitted before the MU-RTS TXS frame.

Transmission time of CTS frame to be transmitted as response to MU-RTS TXS frame+2*SIFS+transmission time of RTS frame to be transmitted by non-AP station. That is, 2*SIFS+CTS+RTS (2*16 us+44 us (6 Mbps CTS)+52 us (6 Mbps RTS)=128 us).

Transmission time of CTS frame to be transmitted as response to MU-RTS TXS frame+2*SIFS+transmission time of RTS frame to be transmitted by non-AP station+ SIFS. That is, 3*SIFS+CTS+RTS (3*16 us+44 us (6 Mbps CTS)+52 us (6 Mbps RTS)=144 us).

Transmission time of CTS frame to be transmitted as response to MU-RTS TXS frame+2*SIFS+transmission time of RTS frame to be transmitted by non-AP station+ SIFS+transmission time of CTS frame to be transmitted as response by AP. That is, 3*SIFS+2*CTS+RTS (3*16 us+2*44 us (6 Mbps CTS)+52 us (6 Mbps RTS)=188 us).

As described above, the values of the duration field of the MU-RTS TXS frame and the frame transmitted before the MU-RTS TXS frame may be configured based on a time point of transmission of a response to a UL PPDU including an initiating frame. In this case, the PPDU including the initiating frame may include a frame for requesting an immediate response frame from the AP. A value of a duration field of the frame for requesting the immediate response frame may be configured with a shared TXOP end time point. The AP may configure the values of the duration fields of the MU-RTS TXS frame and the frame transmitted before the MU-RTS TXS frame as follows.

Transmission time of CTS frame to be transmitted as response to MU-RTS TXS frame+2*SIFS+transmission time of UL PPDU including initiating frame to be transmitted by non-AP station. That is, 2*SIFS+CTS+UL PPDU including initiating frame.

Transmission time of CTS frame to be transmitted as response to MU-RTS TXS frame+2*SIFS+transmission time of UL PPDU including initiating frame to be transmitted by non-AP station+SIFS. That is, 3*SIFS+CTS+UL PPDU including initiating frame.

Transmission time of CTS frame to be transmitted as response to MU-RTS TXS frame+2*SIFS+transmission time of UL PPDU including initiating frame to be transmitted by non-AP station+SIFS+transmission time of a response frame to be transmitted by AP. That is, 3*SIFS+CTS+UL PPDU including initiating frame+response PPDU.

When the station having received allocation of the shared TXOP transmits both the UL PPDU and the P2P PPDU within the shared TXOP, the station having received allocation of the shared TXOP may transmit the P2P PPDU after transmitting the UL PPDU. This is because interruption of the P2P PPDU transmission by the neighbor station can be prevented through transmission of the UL PPDU by the station having received allocation of the shared TXOP. When the station having received allocation of the shared TXOP transmits the P2P PPDU after transmitting the UL PPDU, the above-described restriction applied to transmission of the PPDU including the initiating frame may not be applied. In such embodiments, the station having received allocation of the shared TXOP may end the transmission of the UL PPDU including the initiating frame within a time point indicated by the values of the duration fields of the MU-RTS TXS frame and the frame transmitted before the MU-RTS TXS frame. The station having received allocation of the shared TXOP may receive a response to the UL PPDU from the AP and transmit the RTS frame to the P2P peer station. The P2P peer station may transmit the CTS frame corresponding to a response to the RTS frame by determining that the TXOP, the TXOP holder of which is the AP, has ended before the RTS frame is received.

As described in the above-described embodiments, when the AP configures the value of the duration field, the AP may transmit a frame for TXOP protection after the shared TXOP ends. In this case, the frame for TXOP protection may include at least one of an MU-RTS frame, an RTS frame, a CTS-to-self frame. In this case, the AP needs make configuration so that a sum of the value of the duration field of the frame for TXOP protection, a time used before transmission of the MU-RTS TXS frame, and a duration of a shared TXOP does not exceed a TXOP limit.

Figure 22:
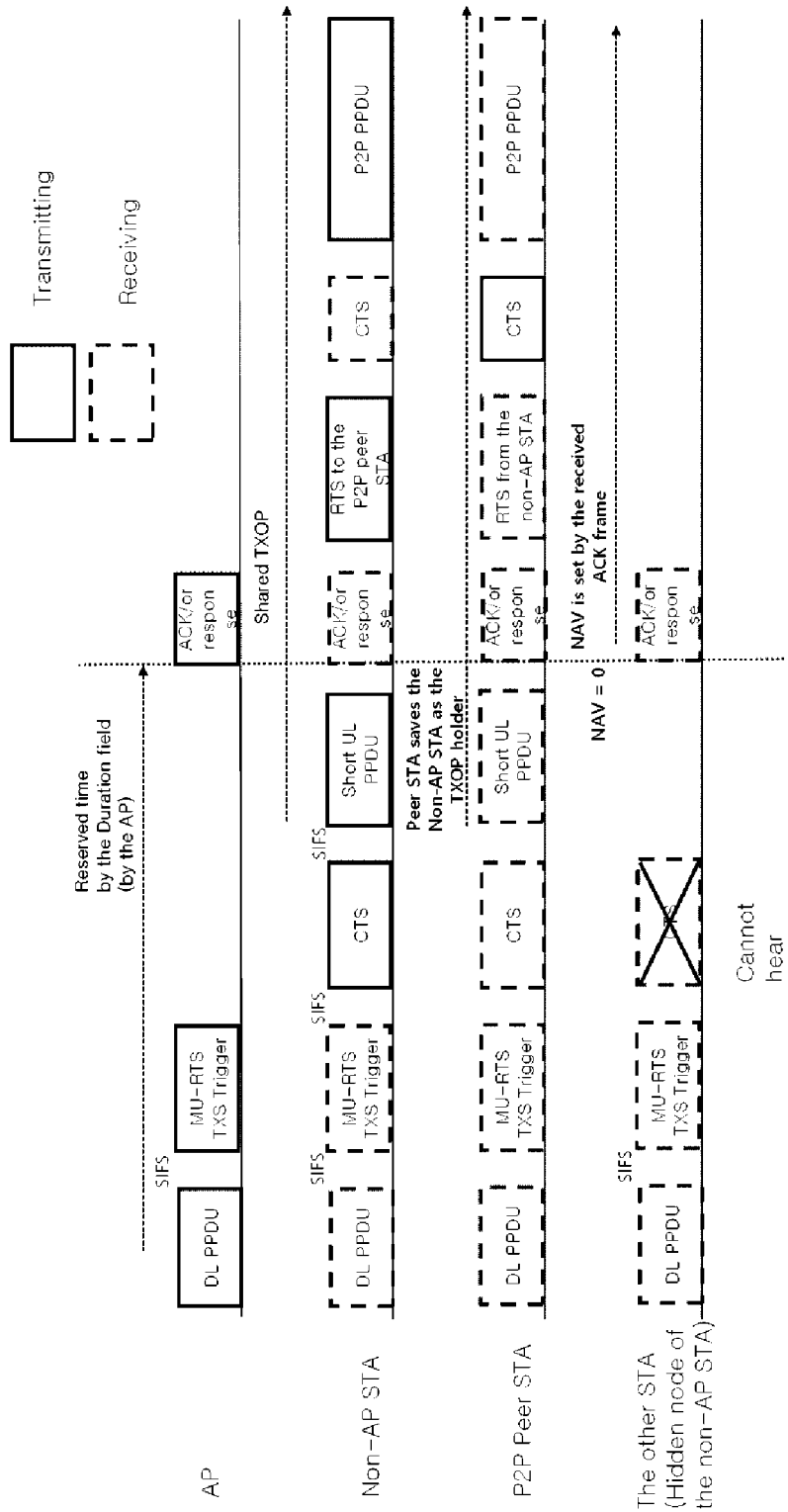
FIG. 22 illustrates that an AP configures a value of a duration field of an MU-RTS TXS frame based on an initiating frame according to an embodiment of the present disclosure.

FIG. 22 illustrates that an AP configures a value of a duration field of an MU-RTS TXS frame based on an initiating frame according to an embodiment of the present disclosure.

In FIG. 22, an AP allocates a shared TXP to a station (non-AP STA) by transmitting an MU-RTS TXS frame. The AP configures a value of a duration field of each of a DL PPDU transmitted before MU-RTS TXS frame transmission and an MU-RTS TXS frame to be equal to or greater than a transmission time point of a UL PPDU to be first transmitted by a station (non-AP STA) within a shared TXOP. The AP transmits a response to the UL PPDU. A neighbor station having received the response to the UL PPDU configures a NAV based on the response. Accordingly, when a P2P peer station (P2P peer STA) receives an RTS frame transmitted by a station (non-AP STA), the P2P peer station (P2P peer STA) determines the station (non-AP STA) as a TXOP holder. The P2P peer station (P2P peer STA) transmits a CTS frame to the station (non-AP STA) as a response to the RTS frame.

In another specific embodiment, a station having received allocation of a shared TXOP may configure a transmitter address, i.e., a TX field, of an RTS frame for protecting transmission of a P2P PPDU with a MAC address of an AP having configured the shared TXOP. The transmitter address indicates the AP corresponding to the TXOP holder, and thus the P2P peer station having received the RTS frame may transmit a CTS frame as a response to the RTS frame. Accordingly, as in the embodiments described through FIG. 22, a TXOP for the P2P PPDU may be configured even though values of duration fields of the MU-RTS TXS frame and a frame transmitted before the MU-RTS TXS frame are not changed. When the station having received allocation of the shared TXOP has received the CTS frame from the P2P peer station, the station having received allocation of the shared TXOP may operate in the same manner in which the station having received allocation of the shared TXOP and the P2P peer station have exchanged the RTS frame and the CTS frame. Accordingly, when the station having allocation of the shared TXOP transmits a P2P PPDU, the station having received allocation of the shared TXOP may apply a rule for the frequency bandwidth applied after the exchange of the RTS frame and the CTS frame. The station having allocation of the shared TXOP may operate as described above when a receiver address, i.e., an RA field, of the CTS frame is identical to a receiver address of the AP having configured the shared TXOP. In another specific embodiment, the station having received allocation of the shared TXOP may operate as described above when a receiver address, i.e., an RA field, of the CTS frame is identical to a transmitter address, i.e., a TA field, of the station having received allocation of the shared TXOP.

In addition, when the station having received allocation of the shared TXOP transmits a trigger frame within the shared TXOP, the station may configure a transmitter address of the trigger frame as a MAC address of the AP having configured the shared TXOP.

Figure 23:
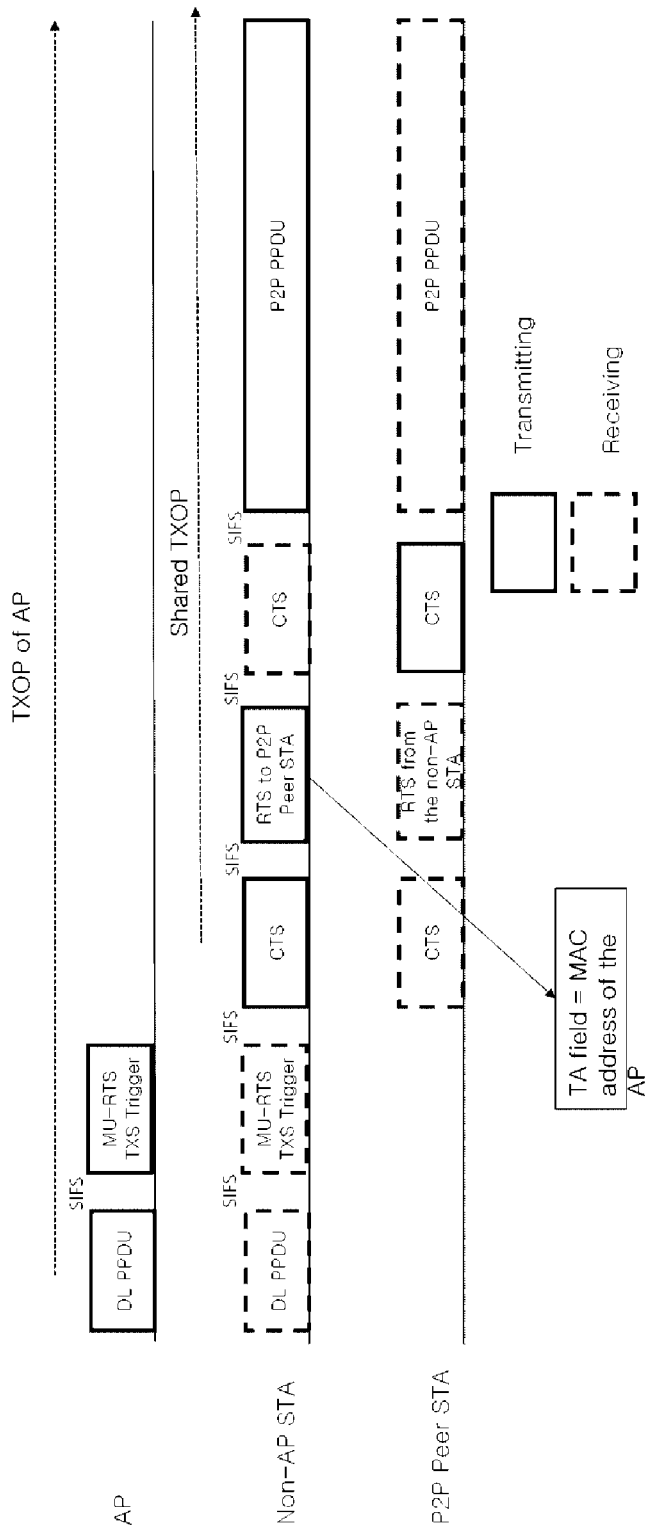
FIG. 23 illustrates that a station having received allocation of a shared TXOP transmits an RTS frame having a transmitter address configured with an AP having configured the shared TXOP according to an embodiment of the present disclosure.

FIG. 23 illustrates that a station having received allocation of a shared TXOP transmits an RTS frame having a transmitter address configured with an AP having configured the shared TXOP according to an embodiment of the present disclosure.

In FIG. 23, an AP transmits an MU-RTS TXS frame and allocates a shared TXOP to a station (non-AP STA). The station (non-AP STA) transmits an RTS frame having a transmitter address configured with an AP to a P2P peer station (P2P peer STA) within the shared TXOP. The P2P peer station (P2P peer STA) receives an RTS frame, the transmitter address of which is the AP, and thus the P2P peer station (P2P peer STA) transmits a CTS frame to the AP. In this case, the station (non-AP STA) may receive a CTS frame and operate on assumption that a receiver address of the received CTS frame indicates the station (non-AP STA). A value of a duration field of each of the MU-RTS TXS frame and the frame transmitted before the MU-RTS TXS frame is configured as an interval including the shared TXOP. Accordingly, a station corresponding to a node hidden from a station (non-AP STA) in a BSS operated by the AP does not attempt to perform transmission within the shared TXOP.

Although the present disclosure is described by using wireless LAN communication as an example, it is not limited thereto and may be also applied to the same to other communication systems such as cellular communication. In addition, the method, device, and system of the present disclosure are described in relation to a specific embodiment thereof, but some or all of the elements or operations of the present disclosure may be implemented using a computer system having general purpose hardware architecture.

The features, structures, effects, and the like described in the above embodiments are included in at least one embodiment of the present disclosure and are not necessarily limited to one embodiment. Furthermore, features, structures, effects, and the like shown in each embodiment may be combined or modified in other embodiments by those skilled in the art. Therefore, it should be interpreted that contents relating to such a combination and modification are to be included in the range of the present disclosure.

Although the present disclosure is described mainly based on the above embodiments but is not limited thereto, it will be understood by those skilled in the art that various changes and modifications are made without departing from the spirit and scope of the present disclosure. For example, each element specifically shown in the embodiments may be modified and implemented. In addition, it should be interpreted that differences relating to such modifications and applications are included in the scope of the present disclosure defined in the appended claims.

The invention claimed is:

1. A non-access point (AP) station for communicating with an AP, the non-AP station comprising:
   a transceiver; and
   a processor,
   wherein the processor is configured to:
   receive a first physical layer protocol data unit (PPDU) comprising a multi user-request to send (MU-RTS) transmit opportunity (TXOP) sharing (TXS) trigger frame from the AP by using the transceiver, the MU-RTS TXS trigger frame allocating a shared TXOP corresponding to a part of a TXOP acquired by the AP to the non-AP station;
   transmit a second PPDU comprising a clear to send (CTS) frame to the AP by using the transceiver as a response to the MU-RTS TXS trigger frame; and
   transmit, based on a subchannel that is most recently designated as a disabled subchannel by the AP, a third PPDU within the shared TXOP by using the transceiver.

2. The non-AP station of claim 1, wherein the processor is configured to transmit the third PPDU in a bandwidth identical to or narrower than that of the second PPDU.

3. The non-AP station of claim 2, wherein CH_BANDWIDTH or CH_BANDWIDTH_IN_NON_HT of TXVECTOR of the third PPDU is configured to have a value equal to or smaller than that of CH_BANDWIDTH_IN_NON_HT of TXVECTOR of the second PPDU.

4. The non-AP station of claim 1, wherein the processor is configured to configure, to be 1, a bit corresponding to the subchannel that is most recently designated as a disabled subchannel by the AP among bits of INACTIVE_SUBCHANNELS of TXVECTOR of the third PPDU.

5. The non-AP station of claim 1, wherein the processor is configured to configure a parameter for a frequency band of the third PPDU based on whether a non-high throughput (HT) PPDU exchange has been performed in the shared TXOP before transmission of the third PPDU.

6. The non-AP station of claim 5, wherein the parameter for the frequency band comprises CH_BANDWIDTH of TXVECTOR, and
   the processor is configured to:
   configure CH_BANDWIDTH or CH_BANDWIDTH_IN_NON_HT of TXVECTOR of the third PPDU to be a bandwidth that is identical to or narrower than CH_BANDWIDTH_IN_NON_HT of RXVECTOR of a non-HT PPDU received before transmission of the third PPDU if the non-HT PPDU exchange has been performed in the shared TXOP before transmission of the third PPDU, and
   configure CH_BANDWIDTH or CH_BANDWIDTH_IN_NON_HT of TXVECTOR of the third PPDU to be a bandwidth that is identical or narrower than CH_BANDWIDTH or CH_BAHDWIDTH_IN_NON_HT of TXVECTOR of the second PPDU if no non-HT PPDU exchange has been performed in the shared TXOP before transmission of the third PPDU.

7. The non-AP station of claim 5, wherein the non-HT PPDU exchange in the shared TXOP before transmission of the third PPDU corresponds to an exchange of a non-HT PPDU comprising an RTS frame and a non-HT PPDU comprising a CTS frame.

8. The non-AP station of claim 5, wherein the third PPDU corresponds to a peer to peer (P2P) PPDU transmitted to a P2P peer station of the non-AP station.

9. The non-AP station of claim 1, wherein a value of a duration field of the MU-RTS TXS trigger frame is configured based on a transmission time point of the second PPDU.

10. The non-AP station of claim 1, wherein the third PPDU corresponds to a peer to peer (P2P) PPDU transmitted to a P2P peer station of the non-AP station, and
    the processor is configured to transmit, to the P2P peer station, an RTS frame before transmitting the third PPDU.

11. A method of operating a non-access point (AP) station for communicating with an AP, the method comprising:
    receiving a first physical layer protocol data unit (PPDU) comprising a multi user-request to send (MU-RTS) transmit opportunity (TXOP) sharing (TXS) trigger frame from the AP, the MU-RTS TXS trigger frame allocating a shared TXOP corresponding to a part of a TXOP acquired by the AP to the non-AP station;
    transmitting a second PPDU comprising a clear to send (CTS) frame to the AP as a response to the MU-RTS TXS trigger frame; and
    transmitting, based on a subchannel that is most recently designated as a disabled subchannel by the AP, a third PPDU within the shared TXOP.

12. The method of claim 11, wherein the transmitting the third PPDU within the shared TXOP comprises transmitting the third PPDU in a bandwidth identical to or narrower than a bandwidth of the second PPDU.

13. The method of claim 12, wherein the transmitting the third PPDU in the bandwidth identical to or narrower than the bandwidth of the second PPDU comprises configuring CH_BANDWIDTH or CH_BANDWIDTH_IN_NON_HT of TXVECTOR of the third PPDU to have a value equal to or smaller than that of CH_BANDWIDTH_IN_NON_HT of TXVECTOR of the second PPDU.

14. The method of claim 11, wherein the transmitting the third PPDU based on the subchannel that is most recently designated as a disabled subchannel by the AP comprises configuring, to be 1, a bit corresponding to the subchannel that is most recently designated as a disabled subchannel by the AP among bits of INACTIVE_SUBCHANNELS of TXVECTOR of the third PPDU.

15. The method of claim 11, wherein the transmitting the third PPDU within the shared TXOP comprises configuring a parameter for a frequency band of the third PPDU based on whether a non-high throughput (HT) PPDU exchange has been performed in the shared TXOP before transmission of the third PPDU.

16. The method of claim 15, wherein the parameter for the frequency band comprises CH_BANDWIDTH of TXVECTOR, and the configuring of the parameter for the frequency band of the third PPDU based on the whether the non-HT PPDU exchange has been performed in the shared TXOP before transmission of the third PPDU comprises:
configuring CH_BANDWIDTH or CH_BANDWIDTH_IN_NON_HT of TXVECTOR of the third PPDU to be a bandwidth that is identical to or narrower than CH_BANDWIDTH_IN_NON_HT of RXVECTOR of a non-HT PPDU received before transmission of the third PPDU if the non-HT PPDU exchange has been performed in the shared TXOP before transmission of the third PPDU; and
configuring CH_BANDWIDTH or CH_BANDWIDTH_IN_NON_HT of TXVECTOR of the third PPDU to be a bandwidth that is identical or narrower than CH_BANDWIDTH or CH_BAHDWIDTH_IN_NON_HT of TXVECTOR of the second PPDU if no non-HT PPDU exchange has been performed in the shared TXOP before transmission of the third PPDU.

17. The method of claim 15, wherein the non-HT PPDU exchange in the shared TXOP before transmission of the third PPDU corresponds to an exchange of a non-HT PPDU comprising an RTS frame and a non-HT PPDU comprising a CTS frame.

18. The method of claim 15, wherein the third PPDU corresponds to a peer to peer (P2P) PPDU transmitted to a P2P peer station of the non-AP station.

* * * * *